Walter H. Bockwoldt,
Clinton Lew,
INVENTORS.
BY.
Walter J. Adam
ATTORNEY.

29 28 31 35 33

PULSE TRAINS

| LINE NUMBER | A | B | C | D | E | F | G | H | I | J | K | L | M | N | O | P |
|---|---|---|---|---|---|---|---|---|---|---|---|---|---|---|---|---|
| 1 | 1 | 12 | 7 | 2 | 13 | 8 | 3 | 14 | 9 | 4 | 15 | 10 | 5 | 16 | 11 | 6 |
| 2 | 10 | 15 | 5 | 16 | 11 | 6 | 1 | 12 | 7 | 2 | 13 | 8 | 3 | 14 | 9 | 4 |
| 3 | 8 | 13 | 3 | 14 | 9 | 4 | 10 | 15 | 5 | 16 | 11 | 6 | 1 | 12 | 7 | 2 |
| 4 | 6 | 11 | 1 | 12 | 7 | 2 | 8 | 13 | 3 | 14 | 9 | 4 | 10 | 15 | 0 | 16 |
| 5 | 4 | 9 | 10 | 15 | 5 | 16 | 6 | 11 | 1 | 12 | 7 | 2 | 8 | 13 | 3 | 14 |
| 6 | 2 | 7 | 8 | 13 | 3 | 14 | 4 | 9 | 10 | 15 | 5 | 16 | 6 | 11 | 1 | 12 |
| 7 | 16 | 5 | 6 | 11 | 1 | 12 | 2 | 7 | 8 | 13 | 3 | 14 | 4 | 9 | 10 | 15 |
| 8 | 14 | 3 | 4 | 9 | 10 | 15 | 16 | 5 | 6 | 11 | 1 | 12 | 2 | 7 | 8 | 13 |
| 9 | 12 | 1 | 2 | 7 | 8 | 13 | 14 | 3 | 4 | 9 | 10 | 15 | 16 | 5 | 6 | 11 |
| 10 | 15 | 10 | 16 | 5 | 6 | 11 | 12 | 1 | 2 | 7 | 8 | 13 | 14 | 3 | 4 | 9 |
| 11 | 13 | 8 | 14 | 3 | 4 | 9 | 15 | 10 | 16 | 5 | 6 | 11 | 12 | 1 | 2 | 7 |
| 12 | 11 | 6 | 12 | 1 | 2 | 7 | 13 | 8 | 14 | 3 | 4 | 9 | 15 | 10 | 16 | 5 |
| 13 | 9 | 4 | 15 | 10 | 16 | 5 | 11 | 6 | 12 | 1 | 2 | 7 | 13 | 8 | 14 | 3 |
| 14 | 7 | 2 | 13 | 8 | 14 | 3 | 9 | 4 | 15 | 10 | 16 | 5 | 11 | 6 | 12 | 1 |
| 15 | 5 | 16 | 11 | 6 | 12 | 1 | 7 | 2 | 13 | 8 | 14 | 3 | 9 | 4 | 15 | 10 |
| 16 | 3 | 14 | 9 | 4 | 15 | 10 | 5 | 16 | 11 | 6 | 12 | 1 | 7 | 2 | 13 | 8 |

FIG. 3.

FIG. 9.

STARTING SEQUENCE COUNTER 204

| STATE OF FLIP-FLOP | | | | STARTING SEQUENCE OF PULSE TRAINS | FRAME NUMBER |
|---|---|---|---|---|---|
| $FF_4$ | $FF_3$ | $FF_2$ | $FF_1$ | | |
| 0 | 0 | 0 | 0 | A | 1 |
| 0 | 0 | 0 | 1 | D | 2 |
| 0 | 0 | 1 | 0 | G | 3 |
| 0 | 0 | 1 | 1 | J | 4 |
| 0 | 1 | 0 | 0 | M | 5 |
| 0 | 1 | 0 | 1 | P | 6 |
| 0 | 1 | 1 | 0 | C | 7 |
| 0 | 1 | 1 | 1 | F | 8 |
| 1 | 0 | 0 | 0 | I | 9 |
| 1 | 0 | 0 | 1 | L | 10 |
| 1 | 0 | 1 | 0 | O | 11 |
| 1 | 0 | 1 | 1 | B | 12 |
| 1 | 1 | 0 | 0 | E | 13 |
| 1 | 1 | 0 | 1 | H | 14 |
| 1 | 1 | 1 | 0 | K | 15 |
| 1 | 1 | 1 | 1 | N | 16 |
| | | | | | |

FIG. 4.

STARTING SEQUENCE

| FRAME | PULSE TRAIN | FRAME | PULSE TRAIN |
|---|---|---|---|
| 1 | A | 9 | I |
| 2 | D | 10 | L |
| 3 | G | 11 | O |
| 4 | J | 12 | B |
| 5 | M | 13 | E |
| 6 | P | 14 | H |
| 7 | C | 15 | K |
| 8 | F | 16 | N |

PULSE TRAIN SEQUENCE
AGMCIOEKBHNDJPFL

EIGHT STAGE PULSE TRAIN COUNTER - FIG. 13.

| INPUT PULSE | STAGE OF FLIP-FLOP | | | | | | | |
|---|---|---|---|---|---|---|---|---|
| | $FF_8$ | $FF_7$ | $FF_6$ | $FF_5$ | $FF_4$ | $FF_3$ | $FF_2$ | $FF_1$ |
| 1 | 0 | 0 | 0 | 0 | 0 | 0 | 0 | 1 |
| 2 | 0 | 0 | 0 | 0 | 0 | 0 | 1 | 1 |
| 3 | 0 | 0 | 0 | 0 | 0 | 1 | 1 | 1 |
| 4 | 0 | 0 | 0 | 0 | 1 | 1 | 1 | 1 |
| 5 | 0 | 0 | 0 | 1 | 1 | 1 | 1 | 1 |
| 6 | 0 | 0 | 1 | 1 | 1 | 1 | 1 | 1 |
| 7 | 0 | 1 | 1 | 1 | 1 | 1 | 1 | 1 |
| 8 | 1 | 1 | 1 | 1 | 1 | 1 | 1 | 1 |
| 9 | 1 | 1 | 1 | 1 | 1 | 1 | 1 | 0 |
| 10 | 1 | 1 | 1 | 1 | 1 | 1 | 0 | 0 |
| 11 | 1 | 1 | 1 | 1 | 1 | 0 | 0 | 0 |
| 12 | 1 | 1 | 1 | 1 | 0 | 0 | 0 | 0 |
| 13 | 1 | 1 | 1 | 0 | 0 | 0 | 0 | 0 |
| 14 | 1 | 1 | 0 | 0 | 0 | 0 | 0 | 0 |
| 15 | 1 | 0 | 0 | 0 | 0 | 0 | 0 | 0 |
| 16 | 0 | 0 | 0 | 0 | 0 | 0 | 0 | 0 |
| | | | | | | | | |

PULSE TRAIN SEQUENCE COUNTER

| STATE OF FLIP-FLOP | | | | PULSE TRAIN SEQUENCE | LINE NO. OF BASIC BLOCK |
|---|---|---|---|---|---|
| $FF_4$ | $FF_3$ | $FF_2$ | $FF_1$ | | |
| 0 | 0 | 0 | 0 | A | 1 |
| 0 | 0 | 0 | 1 | G | 2 |
| 0 | 0 | 1 | 0 | M | 3 |
| 0 | 0 | 1 | 1 | C | 4 |
| 0 | 1 | 0 | 0 | I | 5 |
| 0 | 1 | 0 | 1 | O | 6 |
| 0 | 1 | 1 | 0 | E | 7 |
| 0 | 1 | 1 | 1 | K | 8 |
| 1 | 0 | 0 | 0 | B | 9 |
| 1 | 0 | 0 | 1 | H | 10 |
| 1 | 0 | 1 | 0 | N | 11 |
| 1 | 0 | 1 | 1 | D | 12 |
| 1 | 1 | 0 | 0 | J | 13 |
| 1 | 1 | 0 | 1 | P | 14 |
| 1 | 1 | 1 | 0 | F | 15 |
| 1 | 1 | 1 | 1 | L | 16 |
| | | | | | |

United States Patent Office 3,453,382

Patented July 1, 1969

3,453,382

MULTIPLE INTERLACE TELEVISION SYSTEM

Walter H. Bockwoldt, Sherman Oaks, and Clinton Lew, Culver City, Calif., assignors to Hughes Aircraft Company, Culver City, Calif., a corporation of Delaware Filed Jan. 20, 1964, Ser. No. 338,770

Int. Cl. H04n *3/28, 7/12;* H04b *1/66*

U.S. Cl. 178—6.8 7 Claims

This invention relates to television systems and particularly to an improved television system operating with a relatively low bandwidth and providing a highly desirable picture by utilizing multiple interlace of picture elements.

Television is an important method of commercial communication and has the potential of becoming increasingly important for scientific communication over lunar and interplanetary distances. Conventional television utilizes a wide-band video transmission signal to faithfully reproduce rapid motion of objects in reasonable detail, that is, with a relatively high resolution of moving objects. These large bandwidths result in a relatively high transmission power requirement which is not only undesirable in commercial television systems but would be especially undesirable for transmitting from a space vehicle. The required video bandwidth is determined by the information rate of transmission, that is, the rate of transmission of picture element signals representing variations of the luminance of a scene being viewed. In order to reduce the video bandwith required for television transmission, either the amount of information per frame, which is the signal developed from a scan raster of a screen containing a picture of the field of view, must be reduced or the frame rate must be reduced. If the bandwidth is reduced, portions of the picture requiring wide bandwidth are eliminated resulting in loss of resolution in the reproduced picture. Also if the frame rate is lowered, the result is a picture that cannot convey the illusion of motion satisfactorily due to image jump caused by the motion occurring between frames of the object being viewed, smear and tilt.

The quality of television reception is dependent upon the signal-to-noise ratio at the receiver as well as on the video bandwidth utilized for transmission. As the total noise at the receiver output is equal to the noise spectral density times the video bandwidth, reduction of the video bandwidth reduces the total noise. When the total noise is reduced, less power is required to transmit the signal to achieve a given signal-to-noise ratio at the receiver. A conventional television system utilizing a narrow video bandwidth would require a band-pass filter at the transmitter which results in slow changes of video levels because of the effect of the filter time constant generally changing the shape of the video signal. Thus, a conventional narrow band system is unable to sharply reproduce changes in illuminance between black and white values in the scene being viewed by the camera. Therefore, it is necessary for satisfactory transmission with a band compressed system that both the signal-to-noise ratio and the resolution be considered.

In commercial television systems, a two-fold reduction in bandwidth relative to that of a 60 frames per second system has been achieved by interlacing of lines so that every other line is scanned with different ones of two consecutive scans. This line interlacing reduces the large area flicker at the television picture that is caused by the eye observing noncontinuous illumination of the picture element. This principle of line interlace has been extended to four-fold interlace and higher but has been found to result in crawling effects within the picture, that is, portions of the picture appear to the observer as being moving. Also, at larger interlace ratios, the resolution of the picture is proportionally reduced. Interlacing of lines or dots utilizing conventional techniques for a bandwidth reduction greater than that utilized in commercial television, results in line or dot patterning, that is, the position of the lines or dots develops undesirable patterns on the screen.

It is therefore an object of this invention to provide a television picture transmission system that operates with a minimum of transmission power requirements.

It is another object of this invention to provide a television system operating with a reduced bandwidth and having a picture of desirable resolution quality.

It is still another object of this invention to provide a narrow-band television system that transmits information representative of scenes of moving objects without flicker effects and with satisfactory picture resolution.

It is a further object of this invention to provide a narrow-band multiple interlace television system that reproduces sharp changes in amplitude of the camera video signal at the receiver to overcome the degradation of the video signal caused by narrow-band filtering used in the transmission process.

It is a still further object of this invention to provide a narrow-band multiple interlace television system that develops a picture substantially without crawling or patterning effects.

It is another object of this invention to provide an improved narrow-band television system that develops a high resolution picture for stationary or slowly moving scenes and develops a lower resolution picture for moving scenes.

The system in accordance with the principles of this invention takes advantage of a certain characteristic of the human visual system that the resolution requirements thereof are reduced when viewing objects that are moving with respect to the field of view. Therefore, the bandwidth required by conventional high resolution, high scan rate systems can be reduced with small decrease in viewer acceptance by utilizing a low resolution and an effective high frame rate for moving objects and a high resolution with an effective low frame rate for stationary objects. The system utilizes a multiple interlace encoder and decoder that develops a high resolution and effectively low frame rate television picture composed of a plurality of superimposed low resolution frames in which the informational elements are represented by dots of variable brightness intensity sampled in a uniform pattern over the camera field of view. The coarse dot structures of the low resolution frames become the multiple interlaced fields to compose the high resolution picture. The multiple interlace technique reduces the video bandwidth required for television picture transmission becasue each transmitted low resolution frame contains only a selected portion of the total information required to reproduce a picture.

The video encoder responds to wide-band video signals derived from a camera vidicon and samples the video information at discrete points to produce a signal representing picture dots. The sampled video signal is applied to a pulse stretching circuit and to a band-pass filter for transmission as a narrow band signal. The encoder samples the different elements of the picture in a pseudorandom sequence selected for its uniformity to form a plurality of successive low resolution frames which together form the high resolution format of the picture.

Video information is received at the decoder as a sequence of the plurality of low resolution frames, each containing a portion of the total high resolution picture information. The decoder samples the video signals in a time sequence similar to that utilized at the encoder and sequentially applies the dot patterns of each low resolution frame to a display arrangement. The information in all of the sequence of frames defines a high resolution picture. An arrangement is included to selectively change the storage time of the displayed picture so that an effective low frame rate is provided for stationary scenes and an effective high frame rate is provided for rapidly moving scenes. Thus, fast moving objects are displayed with a minimum of blurring and with a low resolution and stationary objects are displayed with a high resolution. The dot sampling arrangement in accordance with the invention, accurately reproduces sharp changes of the luminance or light intensity of the scene being viewed to substantially overcome the signal degrading effects of the narrow band filtering. Also, the dot sampling of the scene of view in a substantially uniform pattern develops a picture with a minimum of crawling and patterning effects.

The novel features of this invention, as well as the invention itself, both as to its organization and method of operation, will best be understood from the accompanying description, taken in connection with the accompanying drawings, in which like reference characters refer to like parts, and in which:

FIG. 1 is a spectral diagram of frequency versus amplitude for expaling the narrow-band video signal developed by the system in accordance with the invention;

FIG. 2 is a schematic diagram that both represents the screen on which the scene being viewed is projected and which is scanned to develop the camera picture frame and represents the scanned screen of the display device, showing the scan line positions as well as the blocks of repetitive picture elements that are sequentially sampled by the encoder and that are reproduced as dots after decoding to form the improved television picture;

FIG. 3 is a schematic diagram of one of the blocks of FIG. 2 showing scan lines versus sampling or gating pulse trains for explaining the time-spatial relationship in which the picture elements are sampled and the time-spatial relationship of applying variable brightness intensity dots to the television picture;

FIG. 4 shows the pulse train sequence utilized for both encoding and decoding of the video scan information to provide a pseudo-random sampling pattern and shows the starting sequence of the pulse trains for each of the frames;

FIG. 9 is a logical table showing the binary states of the flip flops of the starting sequence counter of FIG. 8 for explaining the selection of the starting sequences of the pulse trains;

Figure 21:
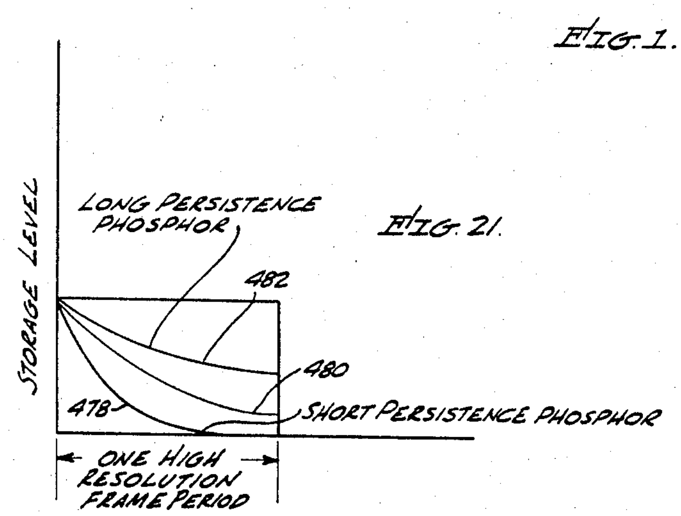
Figure 22:
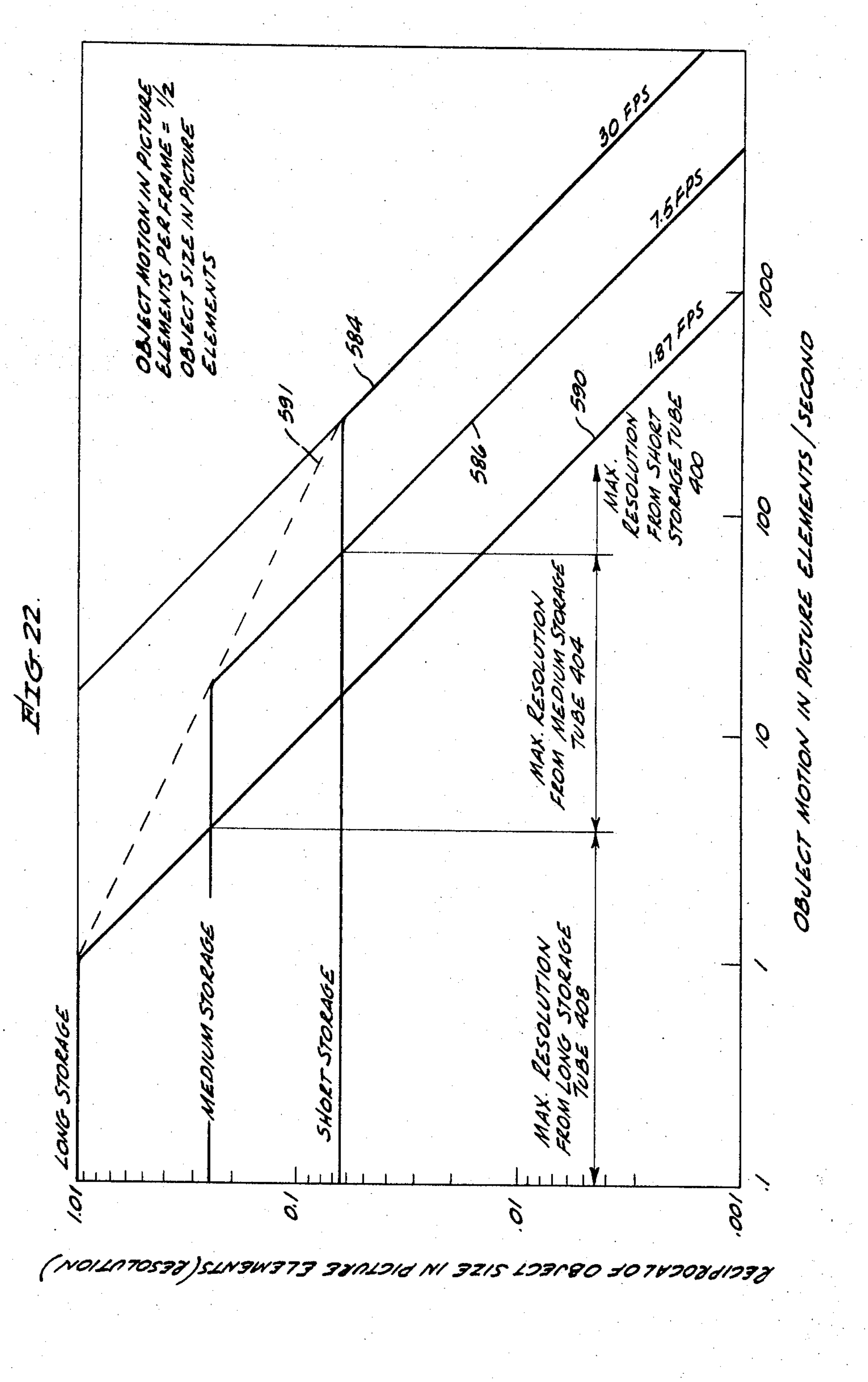

FIG. 21 is a graph of phosphor storage intensity level as a function of time for explaining the storage characteristics of the selectable display tubes in accordance with the invention; and FIG. 22 is a graph showing the object motion in picture elements or dots per second versus the reciprocal of object size of resolution for explaining the resolution characteristics of the system in accordance with the invention.

Figure 1:
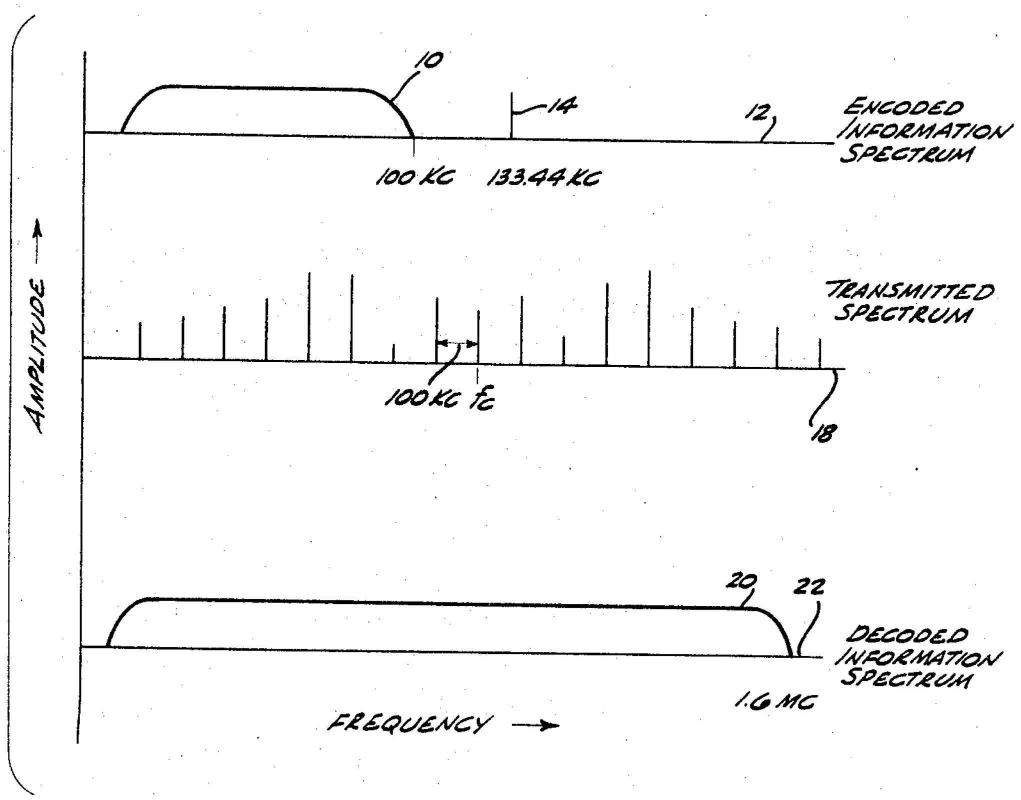

Referring first to FIG. 1, the bandwidth compression features in accordance with the principles of the invention will be generally explained. The video bandwidth is equal to the picture elements or dot sample positions per frame which is the video signal developed from a complete scan raster (number of horizontal elements per scan line times the number of lines) times the frame rate (frames per second) times one-half, with the factor one-half being derived from the worst case condition of alternate black and white picture elements yielding a video waveform having one cycle for every two picture elements. Thus, the required television bandwidth is related to the degree of fine detail required of the television picture and the frame rate. In order to lower the video bandwidth required by a television system while maintaining a frame rate such that moving objects appear to move without "jumping" or "jerking" as a result of the object motion between frames, the information content of each frame must be minimized. To minimize the maximum information rate in the system of the invention, the video signals are encoded to produce as nearly as possible a constant but relatively small information rate.

The required transmitter power is a function of the video bandwidth. The number of picture elements per frame may be reduced in order to decrease the bandwidth and transmitter power but with a resulting reduction of the resolution of the information content of the picture. In considering the lowest acceptable limit of resolution, it should be noted at this time that for the eyes of the human observer the perception of movement is associated with a degradation of resolution. The resolution of the human eye required of objects which are moving relative to the field of view need not be as great as the resolution required of objects stationary relative to the field of view. The system in accordance with this invention selectively provides a high resolution and a low frame rate picture for stationary objects while providing a high frame rate and a low resolution picture for moving objects.

If a narrow band television system were to be utilized exclusively for moving objects, it would be desirable to choose a high frame rate and a low resolution picture. Also, if a television system were to be utilized for viewing only still or stationary objects, a system would be desirable having a high resolution and would be able to utilize a low frame rate. The multiple interlace encoder system (FIG. 7) in accordance with the principles of this invention combines the basic features of each of these systems to provide a desirable overall performance. The system of the invention utilizes a high frame rate in the television camera (FIG. 5) and the resultant video signals are sampled in space or dot positions at a low duty factor to create low resolution video signals in the encoder. The dot positions relative to the field of view of the camera are selected to provide a uniform dot density over the entire format or field of view. Successive low resolution frames are formed by "dot" sampling the video signal derived from different positions in each field of view, which frames are transmitted to the decoder in sequence. The sampled video dot information is interlaced both vertically and horizontally in the decoder (FIG. 15) equipment and may form a single high resolution frame representing the complete television picture. The high resolution frame rate is, for example, 1/16 of the low resolution frame rate while the resolution in the television picture for fixed images when the dot information is stored for a period of sixteen frames, is sixteen times that of a single low resolution frame. For rapidly moving objects, the resolution is determined by the information in the low resolution frame and the information is not stored in order to prevent blurring from the rapid movement. The bandwidth utilized in the multiple interlace encoder system is one-sixteenth of the bandwidth associated with a conventional high resolution low frame rate system of the same number of scan lines. The required transmitter power without a reduction of signal-to-noise ratio at the receiver output is thus reduced approximately by a factor of 16 from that required by a conventional wide-band system.

If the bandwidth were reduced by lowering the frame rate and accepting the effect of non uniform motion of objects, the video signal developed by the presently known vidicon tube at the camera (FIG. 5) would be reduced in amplitude in the same ratio that the scan velocity is reduced. Because a majority of the video noise is in the circuit elements such as transistors of the video amplifier, the signal-to-noise ratio at the amplifier output has thus decreased in proportion to the scan rate decrease. However, with the multiple interlace system of the invention the scan rate at the camera is relatively high. The required bandwidth is maintained at a low value by stretching the sampled video informational pulses in the multiple interlace encoder and passing the resultant waveforms through a low pass filter. Thus, as the video noise within the bandpass of the filter is similar for both a slow scan system and the multiple interlace system in accordance with the invention, the video signal-to-noise ratio at the input of the transmitter would be substantially higher in the multiple interlace system by the interlace ratio, that is, the ratio of the camera frame rate to the high resolution frame rate of the reassembled information at the decoder. Thus, the advantages of the multiple interlace system in accordance with the principles of the invention are reduced bandwidth, improved video signal-to-noise ratio, and a reduced power requirement at the transmitter for a selected signal-to-noise ratio at the receiver.

As shown in the spectral diagram of FIG. 1, a spectral band 10 of a waveform 12 shows the narrow bandwidth of the encoded video information which, for example, may be 100 kc. (kilocycles). As will be explained subsequently, a clock pulse shown as a spectral line 14 is transmitted with the information and may be either within the spectral band 10 or at a convenient frequency such as 133.44 kilocycles. The bandwidth of the low pass filter at the encoder may be, for example, from DC to 100 kilocycles. The video information of the spectral band 10 may be transmitted by any conventional system utilizing well known techniques such as frequency modulation, amplitude modulation, pulse code modulation, radiation, application through a conductor or coding of light beams such as laser beams. If frequency modulation, for example, is utilized, the radio frequency transmitted information may have the spectral configuration of a waveform 18 which shows a conventional radio frequency signal developed by an index of modulation of 5, that is, the ratio of the deviation of the carrier frequency $f_c$ over the modulating frequency. As is well known in the art, a narrow bandwidth video signal may be transmitted without affecting the signal-to-noise ratio at the receiver with a proportionally smaller transmitting power than is required for a wider bandwidth video signal because the total noise is proportional to the bandwidth. As will be explained in detail subsequently, the information derived from the spectral band 10 after transmission, detection and processing is expanded into a video spectral band 20 of a waveform 22 with a wide bandwidth similar to that utilized at the transmitter for a conventional type television system. For example, the spectral band 20 may have a width of 1.6 mc. (megacycles) and if this bandwidth were developed at the transmitter, the transmitting power requirement would be sixteen times that required with the narrow video bandwidth of the encoder system in accordance with the invention.

Figure 2:
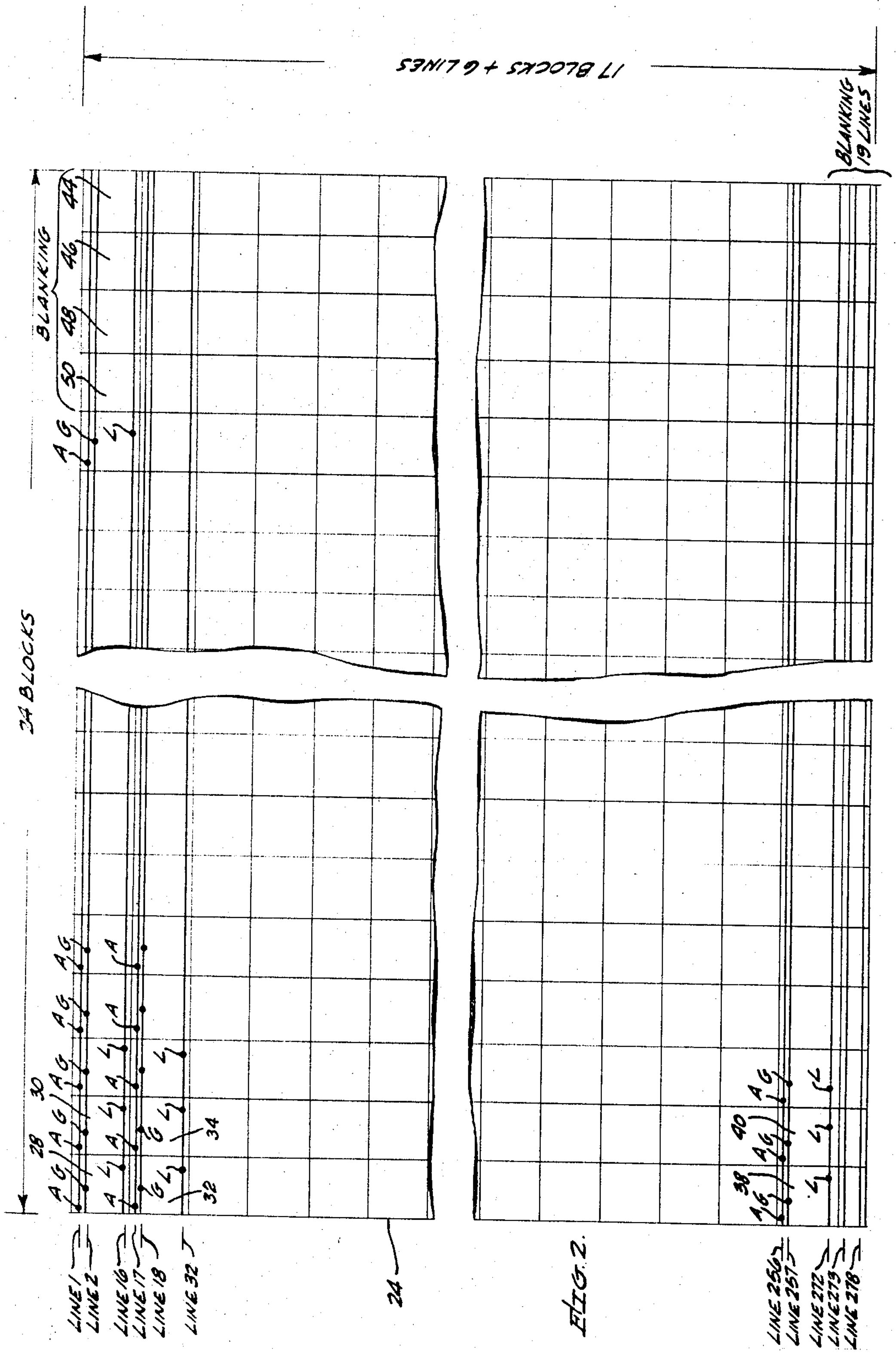
Figure 5:
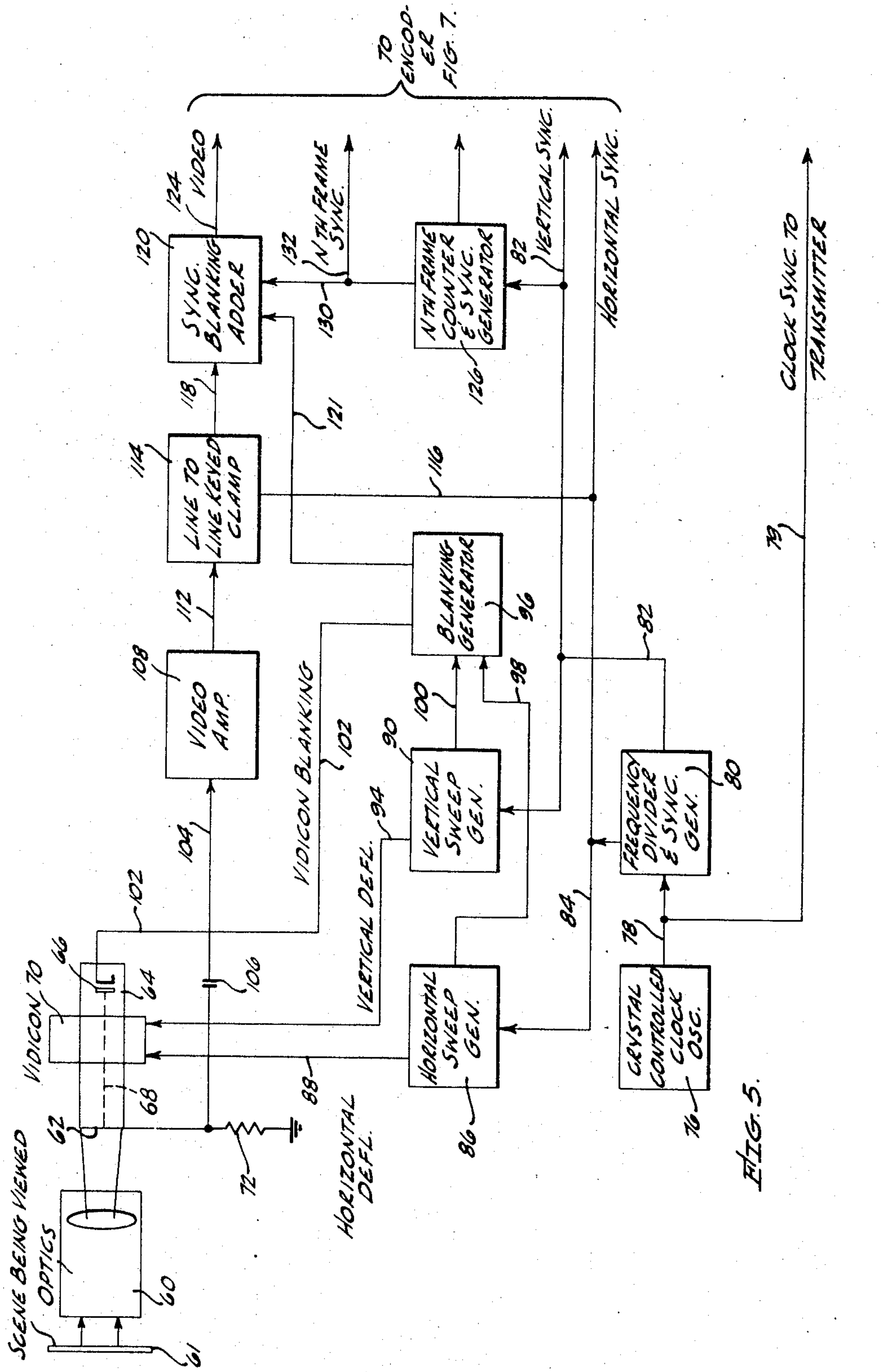
FIG. 5 is a schematic block and circuit diagram showing the camera system including arrangements for generating timing signals for the multiple interlace television system in accordance with the invention.
Figure 7:
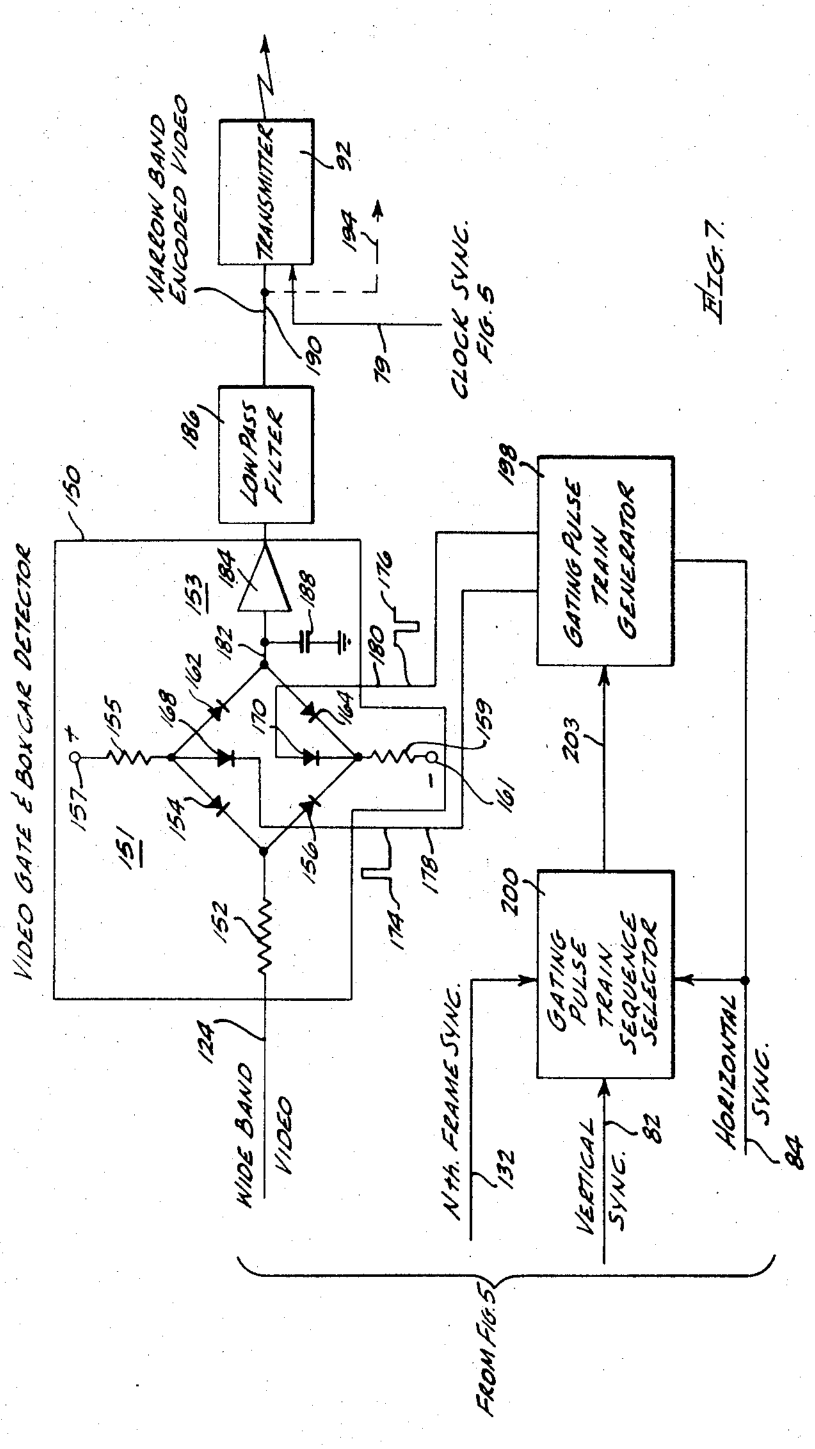
FIG. 7 is a schematic block and circuit diagram showing the multiple interlace encoder system in accordance with the principles of the invention.

Referring now to FIGS. 2, 3 and 4, the sequential time-spatial sampling of the video information as presented to the screen of the camera vidicon (FIG. 5) will be generally explained. The camera picture as applied by the optical system to the face of the vidicon tube of FIG. 5 is shown by an area or camera frame 24 which is a rectangle or square representing the screen in the vidicon or the camera field of view that is continuously scanned at a selected scan rate. It is to be noted that although the area 24 of FIG. 2 is designated as the camera frame 24, a low resolution frame as described herein is the sampled portion of the video signal derived from a complete scan raster and a high resolution frame is the video signal developed by combining the low resolution frames. Also, the area or frame 24 represents the time-spatial arrangement of the reassembled television picture at the decoder of FIG. 15. The scan pattern is horizontal from top to bottom and may include 278 scan lines or positions (including time utilized for blanking) in the entire frame 24, for example. During each scan raster of 278 lines, only a predetermined portion such as 1/16 of the total video signal information derived from the picture in the frame 24 is "dot" sampled or gated through a video gate (FIG. 7). The frame 24 includes a plurality of blocks such as 28, 30, 32, 34, 38 and 40 in which the video information is sampled in a predetermined sequence, the blocks representing the smallest area having a complete dot pattern that is repeated throughout the entire frame. For example, the video signal developed from scan lines 1 and 2 and 16 which represent the scan of an electron beam through the blocks at the top of the frame such as blocks 28 and 30, is sampled during the first complete scan of the frame 24 at times determined by respective pulse trains A, G and L. As will be explained subsequently, each pulse train such as A, G and L has a different sample time relative to the spatial position of the scanning beam over the frame 24 so that sampling of video information at the video gate (FIG. 7) is performed in a desired pattern.

The same sampling times are repeated of the video signal derived from scanning along lines in the blocks 32 and 34 such as along lines 17, 18 and 32 and along lines in blocks 38 and 40 such as lines 256, 257 and 272. It is to be noted at this time that blanking may occur during the time allotted to scan lines 259 to 278 so that video information is not sampled at line 272. Thus, each block such as 28 is a spatial area containing a portion of the scene being viewed through which 16 lines are scanned and the video signal developed thereby is "dot" sampled for a period of time representing the width of one picture element or dot of variable luminance. During following scan rasters of the frame 24, different video information is sampled at different time positions of the video signal derived from each of the 278 lines to form a low resolution frame of video signals for each 278 line scan raster of the frame 24. The frame 24 may include a total of 24 blocks in the horizontal direction and a total of 17 blocks plus 6 lines in the vertical direction. In the horizontal direction of the frame 24, four blocks such as 44, 46, 48 and 50 represent times provided for horizontal blanking during which the beam is retraced to the left hand side of the frame. However, the scan lines are shown as occurring during these periods for clarity of explanation. As discussed above, vertical blanking between the vertical sweeps may occur during the time interval represented by the last 19 horizontal sweep lines but these lines are also shown for clarity of explanation.

To further describe the repetitive dot pattern of the blocks of FIG. 2, the block 28 is shown in FIG. 3 with the time-spatial video sampling or dot locations for each of the low resolution frames 1 through 16. The block 28 representing blocks that are repeated a plurality of times in the frame 24 of FIG. 2 shows the smallest area of a sampling pattern that is repeated. The element positions in the horizontal dimension show the pulse trains A through P with each pulse train representing a potential sampling time of the video signal derived at the corresponding horizontal position when each of the horizontal scans represented by the 16 scan lines pass through the block. The pulse trains are continuously formed, and pulse trains are selected such as A for the first line, G for the second line and M for the third line, during formation of the first low resolution video frame and are applied to the sample or video gate (FIG. 7) during the scan of each corresponding line. As can be seen in FIG. 4, the sequence of pulse trains on a line to line basis is A G M C I O E K B H N D J P F L, each pulse train being formed for sampling from a different line. Each pulse train provides sampling or time gating on a particular line of all 24 blocks determined by the starting pulse train for the first line, the pulse train sequence being continuous and repetitive. Thus, during the first low resolution frame a pulse train A of 24 pulses for the 24 blocks in the horizontal direction of the frame 24 provides gating for line 1, a pulse train G of 24 pulses provides gating for line 2, a pulse train M of 24 pulses provides gating for line 3 and a pulse train L of 24 pulses provides gating for line 16. For the next row of blocks such as 32 and 34 scanned by lines 17 through 32, and in the first low resolution frame, the sequence is repeated with a pulse train A of 24 pulses providing gating for line 17, a pulse train G of 24 pulses providing gating for line 2 and a pulse train L of 24 pulses providing gating for line 32. The pulse train sequence of FIG. 4 is repeated for each of the 17 rows of blocks and for the six additional lines except that blanking occurs during the last 19 lines.

The location of the sampling positions or dots for frame number 1 as shown by the positions of the number 1 in FIG. 3 has a pseudo-random configuration, that is, the dot sampling positions provide a substantially uniform pattern within the block 28. Also, for frames 2 through 16, the location of the sampling positions are substantially uniform for each frame as shown by the numbers representing the frames at which sampling occurs for each location. The sampling locations are further selected so that the accumulated sampled positions of low resolution sampling frames is substantially uniform and is completely uniform for the sixteen frames. Thus, the undesirable effects of crawling of dots resulting from the order of recording on the final picture at the decoder and patterning of dots resulting from the location of the dots at any time is substantially eliminated. As will be explained subsequently, the final picture at the decoder may selectively utilize either full storage, that is, storage for a sufficient length of time that each low resolution frame is effectively repeated 16 times, may utilize a lesser storage time or may utilize a short storage time for the fast moving objects so that the displayed brightness intensity information at any time is essentially only that contained in one low resolution frame.

Thus, the uniform pattern such as shown by any single frame such as frame 1 or the accumulated storage positions after any of the sixteen low resolution frames substantially eliminates both dot crawl and patterning in the decoded picture. As discussed above, dot crawl is caused by the order of applying the final television picture and, for example, if dots in sequential frames were positioned adjacent to each other they would appear to be moving to the human observer. Patterning is caused by the geometric position of the dots and if the dots either in one frame or in sequential frames have such positions to form a pattern, an undesirable condition would be presented to the observer. Thus, during each frame and during the sequence of frames a substantially uniform dot pattern is developed in the television picture by the system of this invention. It is to be noted that other patterns or spatial sampling sequences may be utilized in accordance with the principles of this invention such as a completely random pattern.

To further explain the pulse train sequences, video information is gated in each successive frame time or during each total scan raster by starting the pulse train sequence at a selected different pulse train as shown by the table of FIG. 4 in order to maintain the uniformity of the pattern of the block. Thus, during the second low resolution frame time of sampling of the video signal derived from the picture as received by the vidicon, pulse train D controls the gating time for line 1, pulse train J controls the gating time for line 2, pulse train P controls the gating time for line 3, pulse train F controls the gating time for line 4, pulse train L controls the gating time for line 5, pulse train A controls the gating time for line 6, and pulse train N controls the gating time for line 16. This sequence starting with pulse train D for the first line of the blocks is repeated for each row of 24 blocks in the vertical dimension of the frame 24 such as the rows containing blocks 28 and 32. For frame 3, the sequence of pulse trains for each row of blocks starts with pulse train G and ends with pulse train A. Thus, during each of the 16 low resolution frames, video information is sampled on a line to line basis for each of the rows of blocks at times determined by the pulse train sequence starting at a selected starting pulse train in each row of blocks to form the complete dot pattern of FIG. 3.

Although the sampling pattern or dot pattern has been explained principally relative to the sampling at the encoder, the video information at the decoder (FIG. 15) is sampled in a similar sequence and applied to the screen display tube. The picture pattern on the television picture tube is formed of a plurality of dots of variable brightness intensity between black and white or shades of grey as shown by dots 29, 31, 33 and 35. The first low resolution frame may be recorded in the sequential order for frame 1 on the display screen in positions shown in FIG. 3 as dots such as 29 and 35 for the first two lines. The second low resolution frame is then recorded (in all blocks of the frame 24) in the sequential order shown in FIG. 3 for the first two lines as dots such as 31 and 33. Thus, the dot information of each low resolution frame forms a low resolution picture.

Referring now to FIG. 5, a camera system that may be utilized at the encoder in accordance with the principles of this invention may include an optical arrangement 60 responsive to a scene being viewed indicated as 61 to project a picture upon a photoconductive screen 62 of a suitable unit such as vidicon tube 64. As is well known in the art, an electron gun 66 included in the vidicon tube 64 may continuously, or when in an unblanked condition if blanking is utilized, emit an electron beam 68 to the screen 62, the electron beam being controlled in position to horizontally scan the screen by a conventional horizontal and vertical deflection yoke 70. As the picture elements on the screen 62 of variable luminance or light intensity (having different shades of black and white) are scanned by the electron beam, a varying amplitude of current flows through a resistor 72 to ground to provide a video signal representative of the luminance of the scanned elements. Timing control for the system is provided by a suitable oscillator 76 which may be a crystal controlled clock oscillator and which applies a clock or timing pulse through a lead 78 to a frequency divider and synchronizing pulse generator 80. After division or counting, the frequency divider 80 applies a vertical synchronizing pulse to a lead 82 and a horizontal synchronizing pulse to a lead 84. A horizontal sweep generator 86 responds to the horizontal synchronizing pulse on the lead 84 to apply a horizontal deflection sweep voltage through a lead 88 to the deflection yoke 70. Also, in the proper time sequence a vertical sweep generator 90 responds to the vertical synchronizing pulse on the lead 82 to apply a vertical deflection sweep voltage through a lead 94 to the deflection yoke 70.

In order to provide proper blanking of the vidicon both during retrace of the horizontal sweep and the vertical sweep, a blanking generator 96 responds to a signal applied from the horizontal sweep generator 86 through a lead 98 and to a signal developed by the vertical sweep generator 90 and applied thereto through a lead 100. Properly timed blanking pulses for retrace of both the horizontal sweeps and the vertical sweeps of the vidicon tube 64 are applied from the blanking generator 96 through a lead 102 to the cathode, for example, of the vidicon 64. The signal derived from the electron beam 68 scanning along the photoconductive screen 62 is applied as a wide-band video voltage from the resistor 72 to a lead 104, through a suitable coupling capacitor 106 and to a suitable video amplifier 108. In order to DC restore the video signal at a desired voltage level during blanking of the vidicon 64 as the video amplifier 108 is AC (alternating current) coupled, the video signal is applied from the amplifier 108 through a lead 112 to a keyed clamping circuit 114 which responds through a lead 116 to the horizontal synchronizing pulse. The DC (direct current) restored video signal is applied from the clamping circuit 114 through a lead 118 to a synchronizing blanking adder 120 which adds to the video signal, a blanking signal applied from the blanking generator 96 on a lead 121 and an Nth frame synchronizing signal, which signal provides a synchronizing signal for the decoder. For example, the Nth frame synchronizing signal occurs during the 16th frame for the system described. The system blanking pulse on the lead 121 may have a longer time duration than the vidicon blanking time because the vidicon tube characteristically requires a short period of time to overcome transients after the blanking time. The wide-band video signal is applied through the blanking adder 120 to a lead 124. The Nth frame synchronizing signal is generated by an Nth frame counter circuit 126 which in response to the vertical synchronizing pulse on the lead 82 generates a pulse every N or 16 frames, for example, that is every 16 counts, which signal is applied through a lead 130 to the synchronizing blanking circuit 120 and through a lead 132 to the encoder system.

Figures 6, 11, 14:
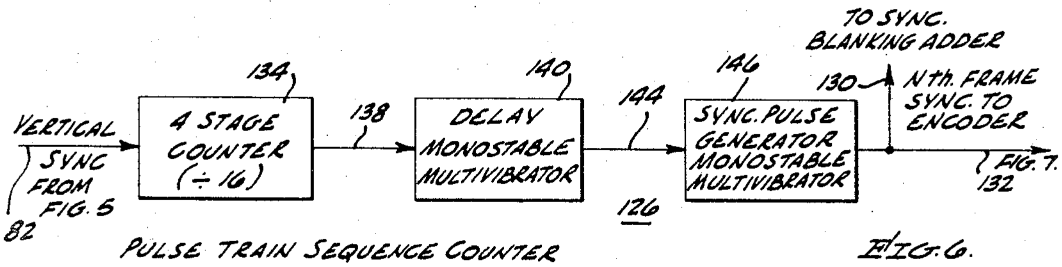
FIG. 6 is a schematic block diagram of the Nth frame counter and synchronizing pulse generator utilized in the arrangement of FIG. 5.
FIG. 11 is a logical table showing the binary states of the flip flops of the pulse train sequence counter of FIG. 8.
FIG. 14 is a logical table showing the binary states of the flip flops of the pulse train counter of FIG. 13 for forming the gating pulse trains.

Referring now to FIG. 6, the Nth frame counter and synchronizing generator 126 may include a conventional four stage flip-flop counter 134 responding to vertical synchronizing pulses applied thereto on the lead 82 to develop a pulse at every sixteenth count which is applied to a lead 138 to trigger a delay monostable multivibrator 140. A delayed pulse is then applied from the delay multivibrator 140 through a lead 144 to a pulse generator 146 which may include a monostable multivibrator to apply the Nth frame synchronizing pulse of a predetermined width to the leads 130 and 132.

Referring now to FIG. 7, the multiple interlace encoder system in accordance with the principles of this invention may utilize a video or sample gate and box car detector circuit 150 including a video gate 151 and a pulse stretching circuit or box car detector 153. It is to be noted that the circuit 150 may include any of a plurality of conventional video gate circuits followed by a conventional box car detector circuit. The circuit 150 which allows bidirectional current to pass through when closed, may include diodes 154 and 156 having respective cathodes and anodes responsive through a resistor 152 to the wide-band video signal on the lead 124. The circuit may also include diodes 162 and 164 having respective anodes and cathodes coupled to the anodes and cathodes of the respective diodes 154 and 156 and may include diodes 168 and 170 respectively having anodes and cathodes coupled to the anodes and cathodes of the diodes 154 and 156. The anode of the diode 154 is coupled through a resistor 155 to a suitable source of potential such as a positive terminal 157 and the cathode of the diode 156 is coupled through a resistor 159 to a suitable source of potential such as a negative terminal 161. Complementary gating pulses of waveforms 174 and 176 are applied through respective leads 178 and 180 to the cathode and the anode of the respective diodes 168 and 170. It is to be noted that other gating arrangements that may be utilized in accordance with the principles of the invention may operate in response to a single gating pulse and the gating pulses A through P (FIG. 3) are generally described as a single pulse similar to that of the waveform 174, for example. The gated video signal is applied from the cathode and the anode of the respective diodes 162 and 164 to a lead 182 and a video amplifier 184 to a low pass filter 186. The lead 182 may be coupled to ground through a suitable capacitor 188 for providing the box car pulse stretching and holding operation of the circuit.

In operation, video signals on the lead 124 are only applied to the lead 182 in response to the gating pulses of the waveform 174 and 176. The video signal after being gated and formed into a continuous signal by the box car operation, is applied through the low pass filter 186 to a lead 190 which in turn is coupled to a suitable transmitter 192, for example. As discussed previously, the video information may be transmitted through any suitable information carrying arrangement such as a frequency modulation or an amplitude modulation transmitter or may be passed (with or without frequency conversion) through a conductor indicated by a dotted line 194. The clock synchronizing pulse shown by the spectral line 14 (FIG. 1) is applied to the transmitter 92 on the lead 79.

The gating pulses, that is, the pulses A to P as explained relative to FIG. 3, are continuously developed in a gating pulse train generator 198 and selected in response to signals developed by a gating pulse sequence selector 200. The Nth frame synchronizing pulses, the vertical synchronizing pulses and the horizontal synchronizing pulses are applied through respective leads 132, 82 and 84 to the sequence selector 200 which in turn applies sequence selecting pulses through selected ones of 16 leads indicated by a composite lead 203 to the gating pulse train generator 198. Also, a horizontal synchronizing pulse is applied from the lead 84 directly to the gating pulse generator 198.

Figure 8:
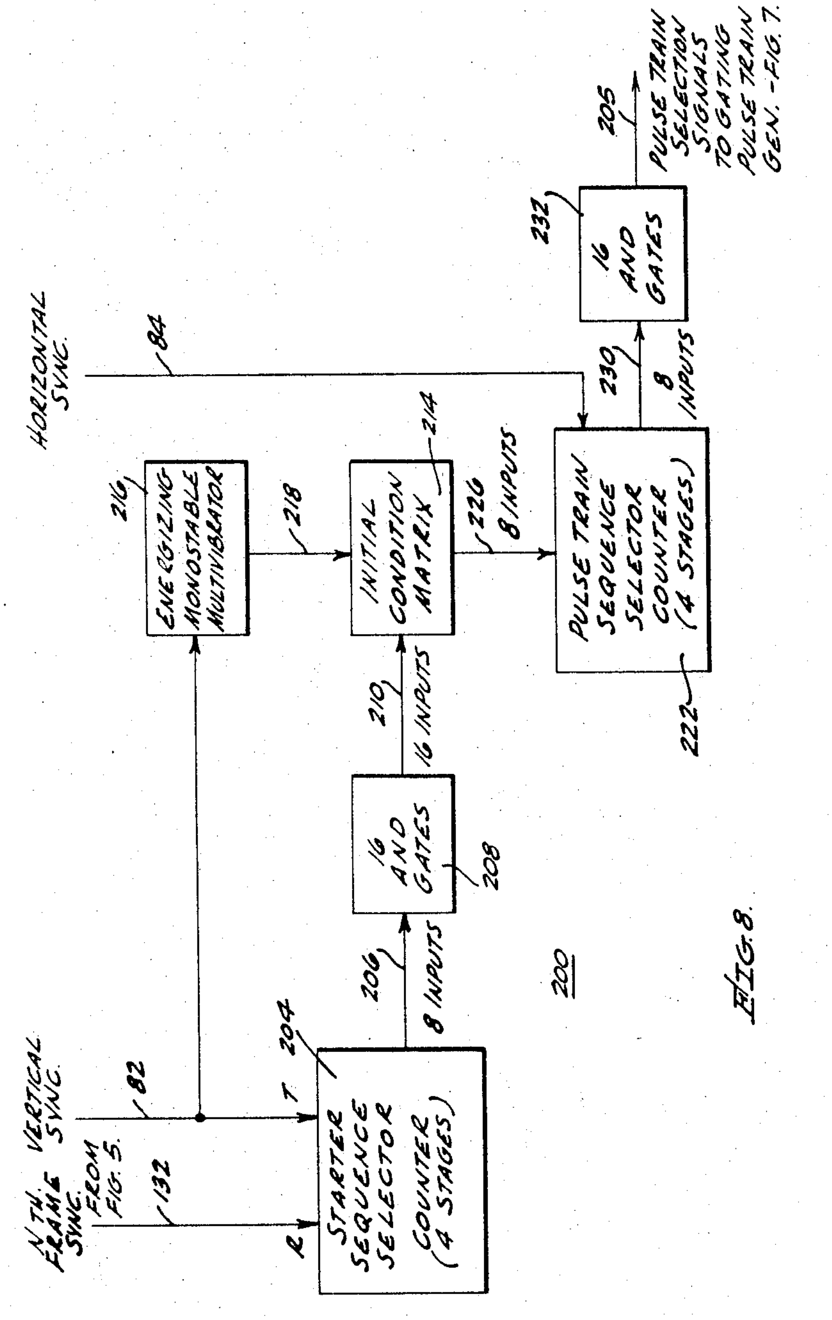
FIG. 8 is a schematic block diagram showing the gating pulse train sequence selector system utilized in the encoder system of FIG. 7.

Referring now to FIG. 8, the gating pulse train sequence selector 200 of FIG. 7 may include a starting sequence counter 204 responsive to the Nth frame synchronizing pulse on the lead 132 for being reset to a synchronous condition and responsive to the vertical synchronizing pulse on the lead 82 to change count for each of the N or 16 low resolution frames. The counter 204 applies signals through eight separate leads indicated as a composite lead 206 to an "and" gate circuit 208 including 16 separate "and" gates. Signals developed by the "and" gate circuit 208 are applied through 16 separate leads indicated as a composite lead 210 to an initial condition matrix 214. An energizing monostable multivibrator 216 is responsive to the vertical synchronizing pulse on the lead 82 to energize the initial condition matrix 214 through a lead 218 at the start of each low resolution frame time. A pulse train sequence counter 222 is provided with four flip flop stages to respond to signals applied thereto from the initial condition matrix 214 through eight separate leads indicated as a composite lead 226. The pulse train sequence counter 222 after being set to an initial condition in response to the initial condition matrix 214 being energized by the monostable multivibrator 216 is triggered to develop a different count for each line in response to the horizontal synchronizing pulse applied thereto on the lead 84. The pulse train sequence counter 222 thus selects a different pulse train A through P for each adjacent 16 lines in the pulse train sequence of FIG. 4 starting at an initial pulse train as determined by the frame number counted by the starting sequence counter 204. The flip flop output signals developed by the sequence counter 222 are applied through eight separate leads indicated as a composite lead 230 to an "and" gate circuit 232 including sixteen "and" gates which apply pulse train selection signals to the sixteen separate leads indicated as the composite lead 205.

To further explain the operation of the starting sequence counter 204 of FIG. 8, the logical table of FIG. 9 shows the states of the four flip flops contained therein for each of the 16 starting sequences or starting pulse train of the sequence of pulse trains required for frames 1 through 16 as shown in FIG. 4. Thus, each of the 16 counts of counter 204 defines a starting sequence or starting pulse train A, D, G, J . . . N of the sequence of 16 pulse trains A, G, M, C . . . F, L, which pulse train sequence, that is, A, G, M . . . L, continues for an entire low resolution frame being repeated for each row of blocks (FIG. 2). As the binary count of the counter 204 changes value, the next starting pulse train for the next frame is gated to the video gate 151 (FIG. 7) and the repetitive pulse train sequence with each pulse train having 24 pulses continues for that low resolution frame, being repeated for each row of blocks or 16 lines. The starting sequence counter 204 thus selects a different starting pulse train of the fixed sequence for each of the 16 low resolutions frames or complete horizontal scan rasters.

Figure 10:
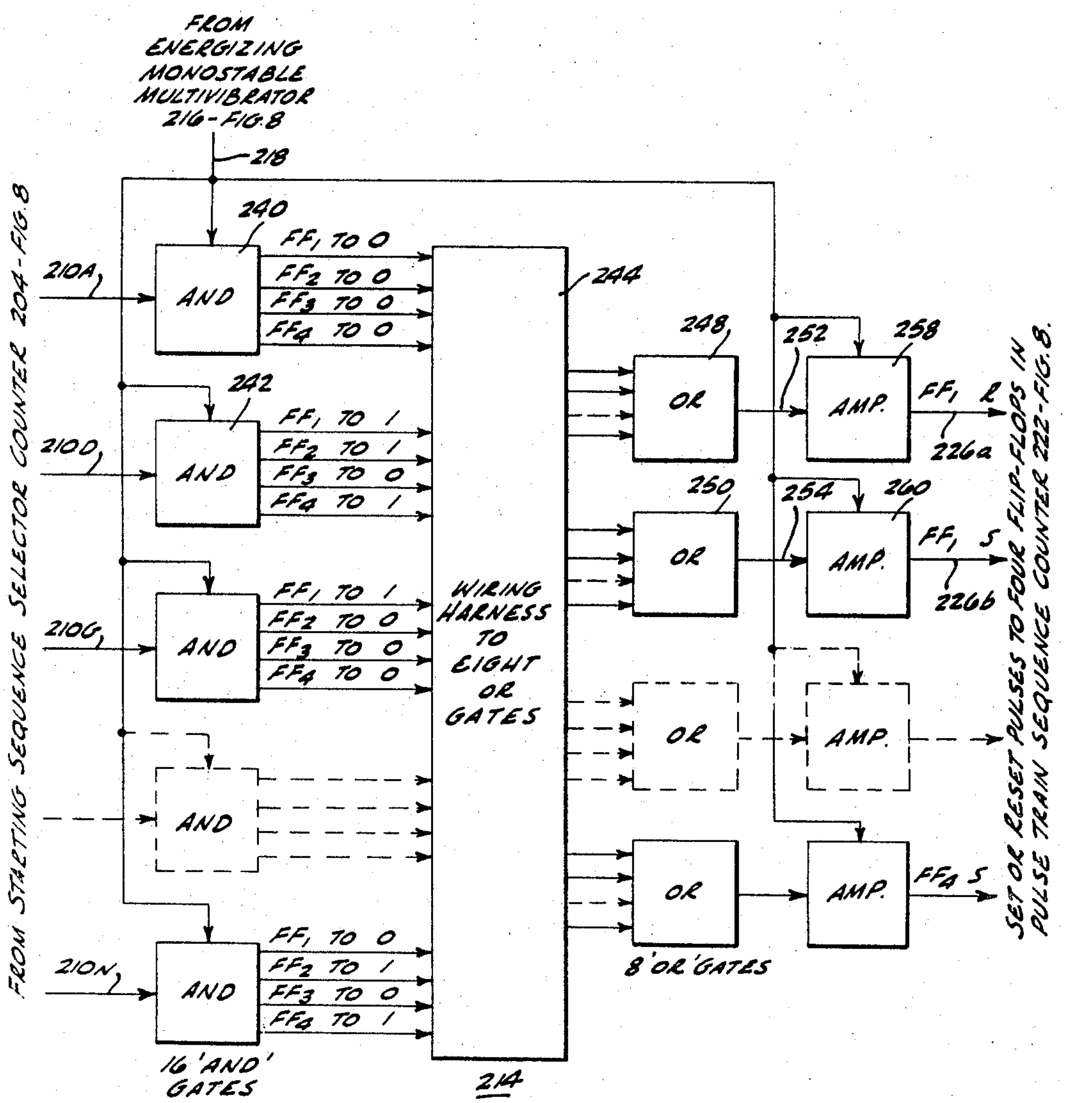
FIG. 10 is a schematic block diagram showing the arrangement of the initial condition matrix of FIG. 8.

As shown by the block and wiring diagram of the initial condition matrix 214 of FIG. 10, the sixteen input leads such as $210_A$, $210_D$ and $210_D$ developed by the "and" gate 208 are applied to "and" gates such as 240 and 242 which gates are only energized in response to the vertical synchronizing pulse triggering the monostable multivibrator 216 (FIG. 8). Each of the "and" gates such as 240 and 242 which converts the count of the starting sequence counter (FIG. 9) to the count of the pulse train sequence applies either high or low level binary signals on four leads through a wire harness or interconnection arrangement 244 to eight "or" gates such as 248 and 250. The starting sequence counter logic as shown in FIG. 9 sequentially counts from 0 0 0 0 to 1 1 1 1 with a different count for each high resolution frame on the frame to frame starting sequence of A, D, G, J through N. The count of the counter 204 is converted to the proper count of the pulse train sequence A, G, M, C . . . L, of the pulse train counter 222 by wiring connections in the "and" gates such as 240 and 242. Thus, the wiring harness 244 is arranged so that each starting condition for each of the sixteen low resolution frames as defined by the count shown in the table of FIG. 9 and as converted by the "and" gates such as 240 and 242 establishes the proper binary signals in the leads such as 252 and 254 at the output of the "or" gates such as 248 and 250. Each of the leads such as 252 and 254 is coupled through gated amplifiers such as 258 and 260 to the leads such as **226*a* and 226*b* which may respectively represent reset and set signals to be applied to the pulse train sequence counter 222**.

As shown by the logical table of FIG. 11, the counter 222 responds to the four reset and the four set signals to repetitively count in the line to line pulse train sequence of A, G, M through L. The counting occurs on a line to line basis in response to the horizontal synchronizing pulse applied thereto on the lead 84. The initial count is established by the initial condition matrix 214 in response to a pulse applied thereto from the monostable multivibrator 216. For example, if the starting sequence counter 204 is set to 0001 (frame 2) representing a starting pulse train D, the "and" gate 242 is energized and an initial condition 1011 (FIG. 11) is established in the pulse train sequence counter 222 for frame 2.

Figure 12:
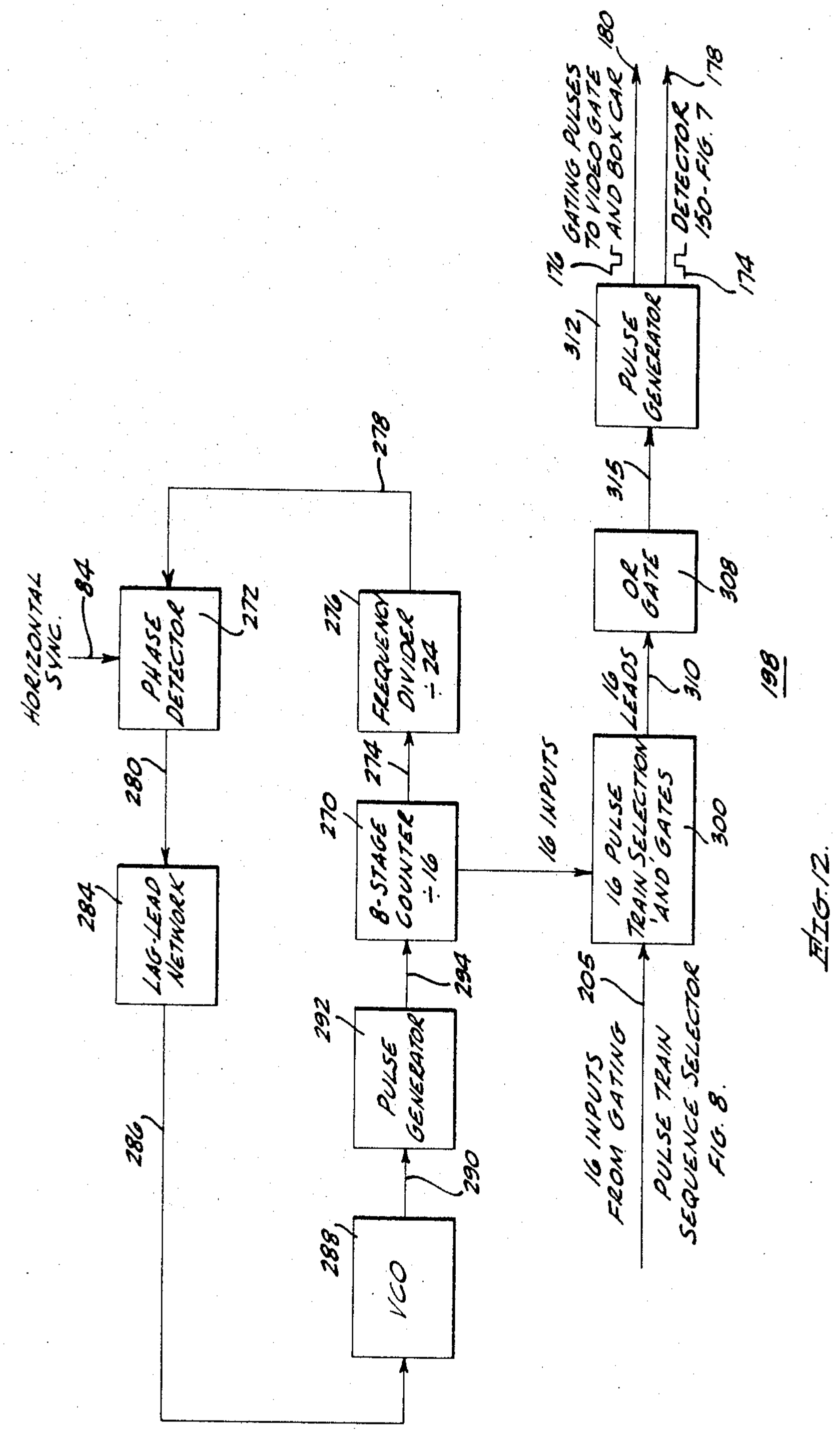
FIG. 12 is a block diagram of the gating pulse train generator of FIG. 7.

The gating pulse train generator 198 of FIG. 7 which is shown in further detail in FIG. 12 includes an eight stage counter 270 that responds through a phase correction loop to a horizontal synchronizing pulse applied on the lead 84 to a phase detector 272. The signal developed by the counter 270 is applied through a lead 274 to a frequency divider 276 which may be a conventional counter dividing circuit. The divider 276 applies pulses through a lead 278 to the phase detector 272 to provide a comparison of the phase of the divided pulse and the horizontal synchronizing pulse. The voltage resulting from the phase comparison is applied through a lead 280 to a lag-lead network 284 for stabilizing the servo loop and through a lead 286 to a voltage controlled oscillator 288. The alternating wave developed by the voltage controlled oscillator 288 is applied through a lead 290 to a pulse generator 292 which may be a monostable multivibrator and through a lead 294 to the eight stage counter 270. Thus the eight stage counter is maintained in synchronism with the horizontal synchronizing pulse applied to the phase correction loop on the lead 84 regardless of minor variations in characteristics of the voltage controlled oscillator 288. In one arrangement in accordance with the invention, the horizontal synchronizing pulse on the lead 84 may have a frequency of 8340 pulses per second, the voltage controlled oscillator 288 may operate at 3.2 megacycles per second and the frequency divider 276 may divide by a factor of 24. As the eight stage counter divides by 16 the frequency of the signals between the leads 294 and 274, the servo loop maintains the counter 270 synchronized with the horizontal synchronizing pulse. The counter 270 develops a trigger pulse for continuously forming each of the sixteen pulse trains.

Figure 13:
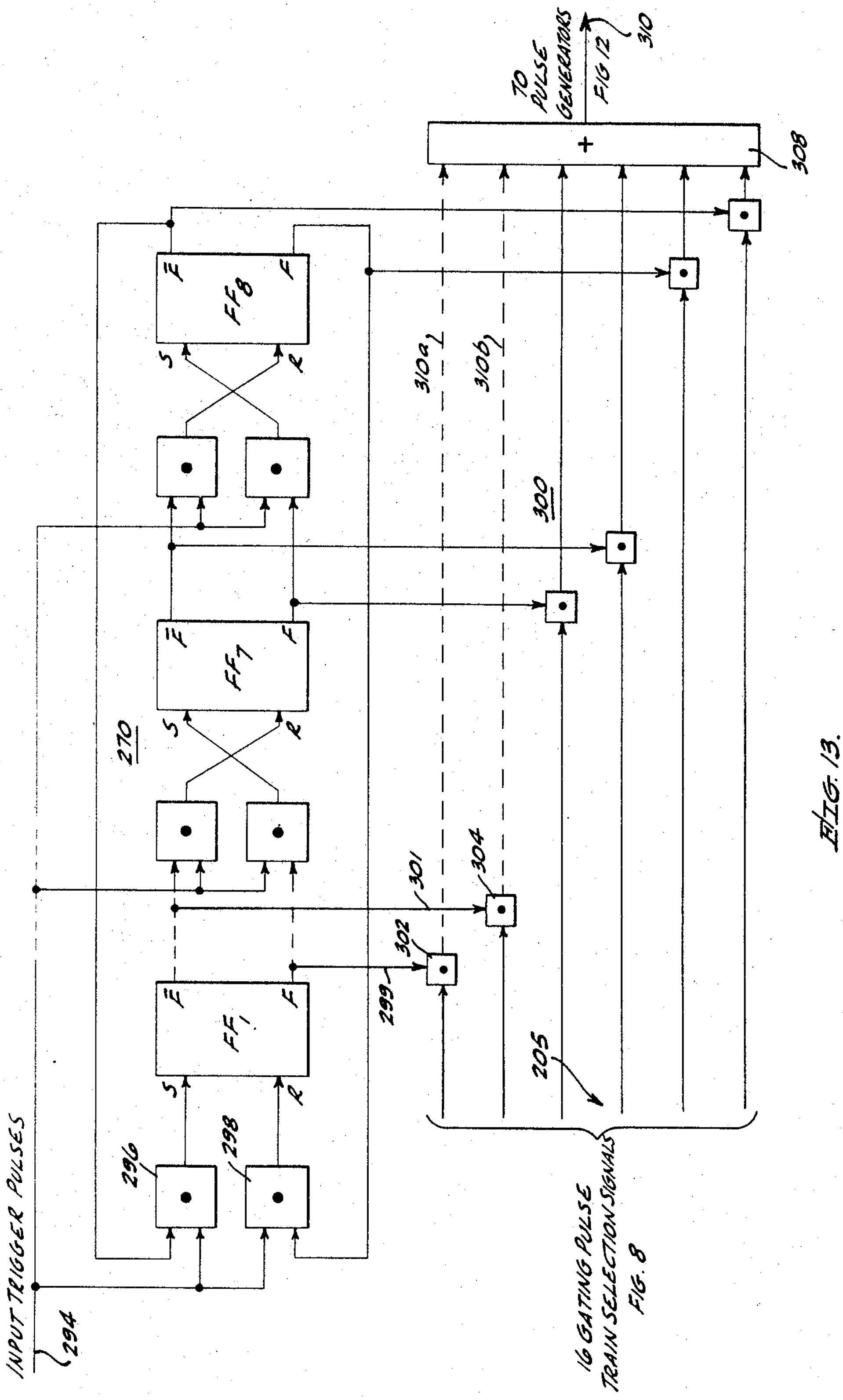
FIG. 13 is a schematic block diagram of the eight-stage pulse train counter and the sixteen pulse train selection gates of the gating pulse train generator of FIG. 12.

As shown in FIG. 13, the eight stage counter 270 may include eight flip flops each having appropriate set and reset logical "and" gates such as 296 and 298 responsive to the condition of other flip flops as well as to an input trigger pulse applied thereto on the lead 294. Each flip flop such as $FF_7$ is sequentially set to a false state in response to eight trigger pulses to form eight gating pulses. As the next eight trigger pulses are applied to the lead 94, each flip flop is sequentially reset to the true state in response to eight trigger pulses to form eight gating pulses. These two sequencies of the eight flip flops being reset to the true state and set to the false state is continuous so that pulses to form each of the 16 pulse trains are continuously applied in the proper time sequence to the corresponding "and" gates such as 302 and 304. Thus, each flip flop changes state only in response to a pulse developed by the pulse generator 292 and all of the flip flops change state in synchronism with the input trigger pulses on the lead 294.

The logical table of FIG. 14 shows the states of the eight flip flops of the counter 270 as the count changes in response to 16 sequential input pulses, that is, the pulses developed in synchronism with the horizontal synchronizing pulses applied thereto from the voltage controlled oscillator 288 through the pulse generator 292. It is to be noted that the flip flops of the counter 270 are arranged so that only a single flip flop changes state in response to each input trigger pulse on the lead 294 which further insures the accurate and reliable time relation of the gating pulses relative to each other and relative to the horizontal synchronizing pulse. The true and false output leads of each of the flip flops of the counter 270 are applied to an "and" gate circuit 300 through a total of sixteen separate leads such as 299 and 301 of the composite lead 281. The "and" gates such as 302 and 304 of the "and" gate circuit 300 each respond to the "and" gate circuit 232 of the gating pulse train sequence selector 198. Therefore, the counter 270 continuously counts to develop 16 trains of trigger signals for developing pulses in a pulse generator 312. Twenty-four trigger pulses for each pulse train are sequentially gated through the circuit 300, that is, 24 pulses for the first pulse train and 24 pulses for each of the subsequent pulse trains. The gating is provided by a gating pulse (having a time width equal to the time of scanning one line) on the leads 205 being applied to a single "and" gate such as 302 or 304 in response to each horizontal synchronizing pulse. Thus, these trigger signals that form the gating pulses are only applied to an "or" gate 308 through leads such as 310*a* and 310*b* shown as a composite lead 310 in FIG. 12, in response to a gating pulse derived from the pulse train sequence counter 222 (FIG. 8) and applied thereto on the sixteen leads of the composite lead 205. During the sixteen binary states of the counter 270, each flip flop that changes state develops a trigger pulse that forms one of the pulse trains A, G, M through L. During the scan of each line (FIG. 2) only one pulse train such as A or G, M through L is passed through the gate 300. The pulse train sequence counter 222 for each group of 16 scan lines (FIG. 2) selects a different "and" gate such as 302 and 304 so the pulses for forming the correct pulse trains are gated therethrough. Thus for each scan line during the time of scanning each block as shown in FIG. 4, each of the pulses for forming the sixteen pulses are repetitively developed, but as controlled by the line count of the counter 222, a pulse representing only a single gating pulse is applied to the "or" gate 308 for the time of scanning through one block on one line (a total of 24 pulses for 24 blocks on one line). As discussed above, the pulses representative of pulse trains that are gated to the "or" gate 308 on a line to line basis, are of the pulse train sequence A, G, M . . . L. The trigger pulses applied to the "or" gate 308 are in turn applied through a lead 315 to the pulse generator 312 for forming the complementary pulses of the waveforms 174 and 176 shown on the respective leads 178 and 180 which are applied to the video gate 151 of FIG. 8. The pulses of the waveform 174 may be considered the pulse trains such as A and G. Thus, the video signal on the lead 124 is continuously sampled in the proper time sequence in correspondence with that discussed relative to FIGS. 3 and 4. The sampled video, after being elongated or formed into a continuous signal by the box car detector 153, is then passed through the filter 186 and transmitted to the decoder.

Figure 15:
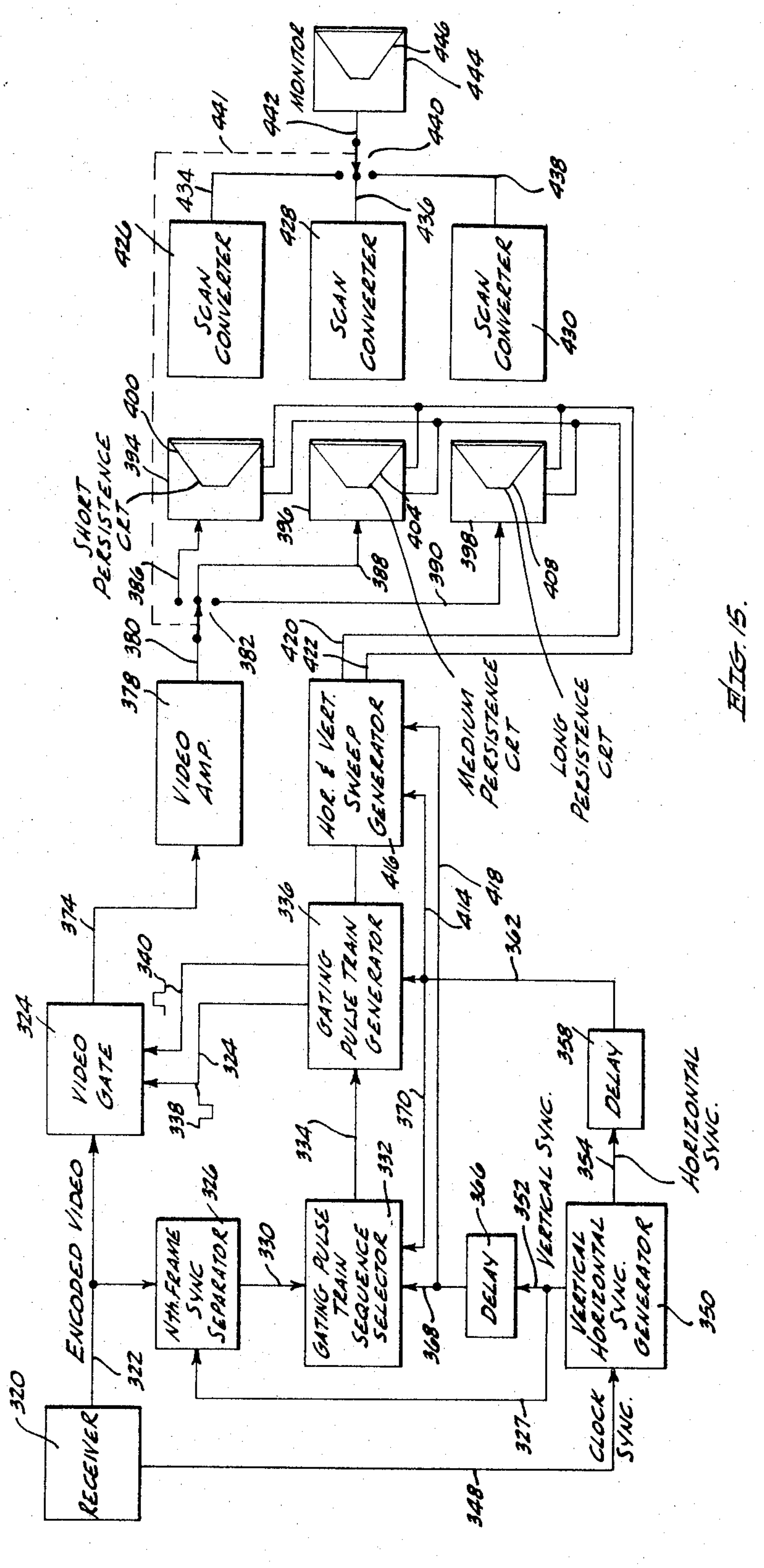
FIG. 15 is a schematic block diagram of the decoder and display system in accordance with the principles of the invention.

Referring now to FIG. 15, the decoder system in accordance with the invention may include a receiver 320 for intercepting the transmitted RF signal, converting the RF signal to video frequency and separating the clock synchronizing signal (FIG. 1) therefrom by a suitable narrow-band filter (not shown). The narrow-band video signal applied to a lead 322 includes a series of low resolution frames of video signals, each sequence of sixteen frames representing a high resolution frame. The video signal on the lead 322 is applied through a video gate 324 which may be similar to the video gate 151 of FIG. 7. An Nth frame or sixteenth frame synchronizing pulse separator 326 is responsive to a coincidence of the Nth frame synchronizing signal from the composite video signal on the lead 322 and to a vertical synchronizing pulse on a lead 327 to apply the Nth frame synchronizing pulse through a lead 330 to a gating pulse train sequence selector 332. The generator 326 may include a conventional "and" gate, for example. The signals developed by the sequence selector 332 are applied through sixteen leads indicated as a composite lead 334 to a gating pulse train generator 336. The gating pulse train sequence selector 332 and the gating pulse train generator 336 are similar to those discussed relative to FIG. 7 and will not be explained in further detail. Gating pulses, which may be complementary pulses of waveforms 338 and 340, are applied through respective leads 342 and 344 to the video gate 324 when utilizing an arrangement similar to the video gate 151 of FIG. 7. The clock synchronizing pulse separated from the video signal by a narrow-band filter is applied from the receiver through a lead 348 to a vertical and horizontal synchronizing pulse generator circuit 350 which applies a vertical synchronizing pulse to a lead 352 and a horizontal synchronizing pulse to a lead 354. The lead 327 may be coupled to the lead 352 for gating the Nth frame synchronizing separation 326. The generator 350 may be a conventional circuit including frequency dividers as is well known in the art. In order to provide a delay to overcome the rise time or the time constant of the video information at the low pass filter 186 of FIG. 7, a delay circuit 358 is coupled between the lead 354 and a lead 362 which in turn is coupled to the gating pulse train generator 336. The delayed horizontal synchronizing pulses are utilized similar to the horizontal synchronizing pulses discussed relative to FIG. 7.

For maintaining the horizontal and vertical pulses in synchronism, a delay circuit 366 is coupled between the lead 352 and a lead 368 to provide a delayed vertical synchronizing pulse to the gating pulse train sequence selector 332 to be utilized similar to that discussed relative to FIG. 7. Also, the delayed horizontal synchronizing pulse is applied from a lead 362 through a lead 370 to the gating pulse train sequence selector 332. The gated video information representing dot information is applied through the video gate 324 to a lead 374 in a time sequence similar to that of the encoding operation. The video dot information is applied from the lead 374 to a suitable video amplifier circuit 378 and through a lead 380 to a suitable switch or switching arrangement 382. The switch 382 may be selectively connected to leads 386, 388 or 390 which are respectively coupled to display arrangements 394, 396 and 398. Because each of the frames of the video information received by the decoder have low resolution video dot information contained therein, a storage arrangement is provided in accordance with the principles of this invention to provide a relatively high resolution picture for stationary or slowly moving objects while at the same time provide a low resolution picture for moving objects. It is to be noted that in some arrangements in accordance with the principles of the invention, the gated video signal on the lead 380 may be applied continuously to all three leads 386, 388 and 390 without a switch 382.

The display arrangement 394 includes a cathode ray tube 400 which may be selected with a screen having phosphor with a relatively short persistence or short retentivity time. The display arrangement 396 includes a cathode ray tube 404 which may be selected with a screen having a phosphor material thereon with a medium persistence and the display arrangement 398 includes a cathode ray tube 408 which may be selected with a screen having a phosphor material thereon with a long persistence characteristic. Thus, for stationary objects, a relatively high resolution picture is provided by controlling the switch 382 to apply the video dot information to the cathode ray tube 408. For displaying an object moving at a relatively slow speed, the switch 382 may apply the video dot information to the cathode ray tube 404. When an object is moving rapidly, the switch 382 is set into a position to apply the video dot information to the cathode ray tube 400 so that blurring is not developed in the picture due to the storage time of the phosphor material.. The cathode ray tube 400 may only store the variable brightness information for a period substantially equal to the time of receiving one low resolution frame so that a low density dot pattern is provided having a low resolution. As discussed previously, the human observer tolerates a relatively low resolution picture for rapidly moving objects. To control the cathode ray tubes, the delayed horizontal synchronizing pulses and vertical synchronizing pulses are applied through respective leads 414 and 418 to a horizontal and vertical sweep generator circuit 416. Horizontal and vertical sweep signals are applied from the sweep generator circuit 416 through leads 420 and 422 to the display arrangements 394, 396 and 398 for controlling the deflection yokes of the corresponding cathode ray tubes in a conventional manner.

If the video dot information selectively applied to the display arrangements is to be transmitted or conveyed for further viewing or use, or is to be monitored on a single display, scan converter or recording storage arrangements 426, 428 and 430 may be positioned to record and read the pictures developed on the respective cathode ray tubes 400, 404 and 408. The scan converters such as 426 may be any conventional arrangement such as a vidicon tube or may be a writing and reading tube such as a dual gun cathode ray tube designated as Raytheon CK7702. The scan converters 426, 428 and 430 are coupled through respective leads 434, 436 and 438 to a suitable switch 440 which may be operated in synchronism with the switch 382 through a dotted connection 441 so that video information is only applied therethrough fromthe display tube selected for display by the switch 382. The switch 440 is coupled through a lead 442 to a television monitor system 444 which may include a single low persistence cathode ray display tube 446 having a P–4 phosphor on the screen thereof, for example. The monitor 446 may be a conventional television monitoring system or television system responsive to video signals. Also, it is to be understood that if the video signal on the lead 442 is to be transmitted to other receiving units, conventional transmititng or conveying units may be utilized.

Referring now to the waveforms of FIG. 16 as well as to FIGS. 5 and 7, the operation of the system in accordance with the invention will be explained in further detail. A vertical synchronizing signal of a waveform 456 which is applied to the lead 82 from the frequency divider 80 is provided to control the retrace of the electron beam 68 of the vidicon tube 64 near the end of each 278 line scan raster or low resolution frame, that is at scan line 259. Also, the vertical synchronizing pulse of the waveform 456 controls the binary count of the starting sequence counter 204 and triggers the monostable multivibrator 216 of FIG. 8. The horizontal synchronizing pulses shown by a waveform 458 which are applied to the lead 84 (FIG. 5) have 278 pulses for the time period of each scan raster, each pulse controlling the timing of a different scan line as explained relative to FIG. 2. The horizontal synchronizing pulses of the waveform 458 are utilized for horizontal blanking of the vidicon tube 64 and for controlling the pulse train sequence counter 222 (FIG. 8) to repetitively count the scan lines. Also the horizontal synchronizing pulses are utilized in the gating pulse train generator 198 of FIG. 12 to maintain the eight stage counter 270 in proper phase or time relation therewith. The vertical synchronizing pulse of the waveform 456 may rise at the fall of the 259th pulse of the waveform 458 and fall at the termination of the 278th pulse of the waveform 458. The blanking and retrace period between low resolution frames may thus occure during the scan time of the lower 19 lines of the frame 24 of FIG. 2, which arrangement occurs at the edge of the field of view. As explained relative to the camera arrangement of FIG. 5, the horizontal and vertical synchronizing pulses of the waveforms 458 and 456 may be developed by a conventional frequency divider arrangement 80 in response to clock pulses developed by the crystal controlled clock oscillator 76 to provide timing control for the entire system. It is to be noted that the time relation of the pulses of the waveforms 462 and 464 is maintained at the decoder system of FIG. 15 by the horizontal and vertical synchronizing pulses developed by the generator 350 and a similar time relation is maintained after the delays provided by the delay circuits 358 and 366.

Figure 16:
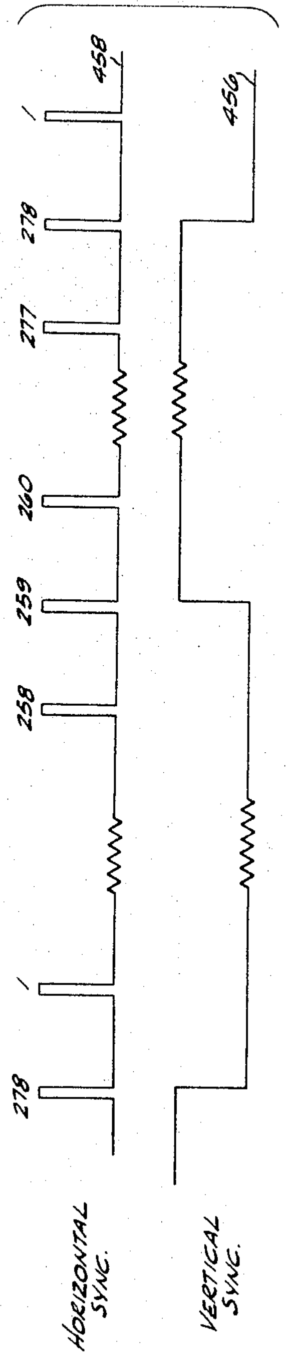
FIG. 16 is a schematic diagram of voltage waveforms as a function of time for explaining the time relation of the horizontal and vertical synchronizing pulses utilized in the encoder and decoder systems of FIGS. 7 and 15.
Figure 17:
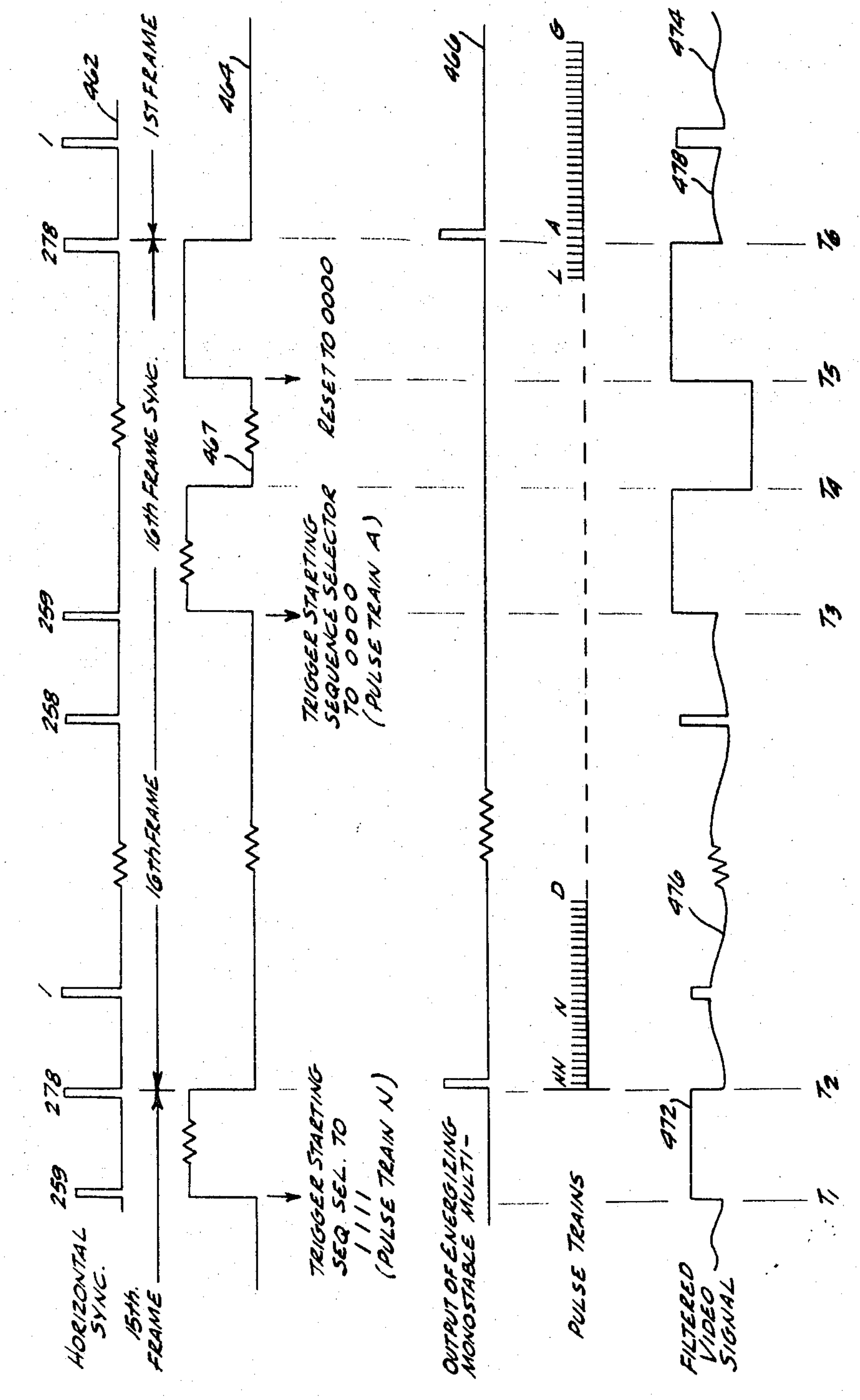
FIG. 17 is a schematic diagram of voltage as a function of time for explaining the frame to frame time relation of the signals deevloped during operation of the encoder and decoder systems of FIGS. 7 and 15.

Referring now to FIG. 17, which shows the frame to frame time relation of the signals utilized in the encoder system of FIG. 7, the horizontal synchronizing pulses of a waveform 462 are shown in a time relation to the vertical synchronizing pulses of a waveform 464 similar to that explained relative to FIG. 16. The starting sequence counter 204 of FIG. 8 is set to 1 1 1 1, for example, at the rise of the vertical synchronizing pulse of the waveform 464 at a time $T_1$. As shown by the table of FIG. 9, this binary count represents the starting sequence N for the sixteenth frame which is set at the fall of the 259th horizontal synchronizing pulse. The 15th low resolution frame for a continupus sequence of operation is terminated at the fall of the 278th horizontal synchronizing pulse of the waveform 462 shown as a time $T_2$ which corresponds in time to the fall of the vertical synchronizing pulse of the waveform 464. At the time $T_2$, the fall of the vertical synchronizing pulse of the waveform 464 triggers the monostable multivibrator 216 (FIG. 8) to apply a pulse of a waveform 466 to the "and" gates of the initial condition matrix 214, FIG. 10). Because the starting sequence selector counter 204 has changed its binary condition to 1 1 1 1 (FIG. 9), the pulse train sequence counter 222 is set to 1 0 1 0 (FIG. 11) preparatory to sampling in the 16th low resolution frame. The initial condition matrix 214 thus responds to the multivibrator pulse of the waveform 466 to initially set the pulse train sequence selector counter 222 to 1 0 1 0 (FIG. 8) so that the 24 pulses of the N pulse train (FIG. 4) provides the gating for line 1 of the 16th frame. The 24 N pulses shown by a waveform 468 are applied to the video gate 151 (FIG. 7) from the gating pulse generator 198 followed for the second scan line by the 24 D pulses. This sequence of gating pulse trains continues for each of the 278 lines in response to the horizontal synchronizing pulses of the waveform 462.

At the 278th horizontal synchronizing pulse of the waveform 462, the L gating pulses (because of the six additional scan lines) are terminated at a time $T_6$. At time $T_3$ in response to the fall of the 259th horizontal synchronizing pulse of the waveform 462 the vertical synchronizing pulse rises and the starting sequence counter 204 is triggered to 0 0 0 0 which is the starting sequence of the next frame, that is, the first low resolution frame of the next high resolution frame period. Between times $T_4$ and $T_5$, an Nth frame or 16th frame synchronizing pulse is developed as indicated by a pulse 467 superimposed on the waveform 464 between horizontal synchronizing pulses 265 to 272. As shown in FIGS. 8 and 15 the Nth frame synchronizing pulse resets the starting sequence counter 204 so that synchronism is maintained between the starting sequences at the encoder and at the decoder. In the first frame of the sequence starting at time $T_6$, the gating pulses are again applied to the video gate 150, that is 24 gating pulses A for line 1 followed by 24 gating pulses G for line 2 in response to the first horizontal synchronizing pulse of the waveform 462 changing the count of the pulse train sequence counter 222 to 0 0 0 1 (FIG. 8).

During the 15th frame the sampled video signal after passing through the box car detector 153 and low pass filter 186 appears similar to a signal 472 of a waveform 474 and during the 16th and first frames, appears similar to signals 476 and 478 of the waveform 474. The low resolution video signals are then sequentially applied to the transmitter 192. It is to be noted that the pulse stretching operation of the box car detector allows the video signal to be filtered without losing positional and amplitude information.

Figure 18:
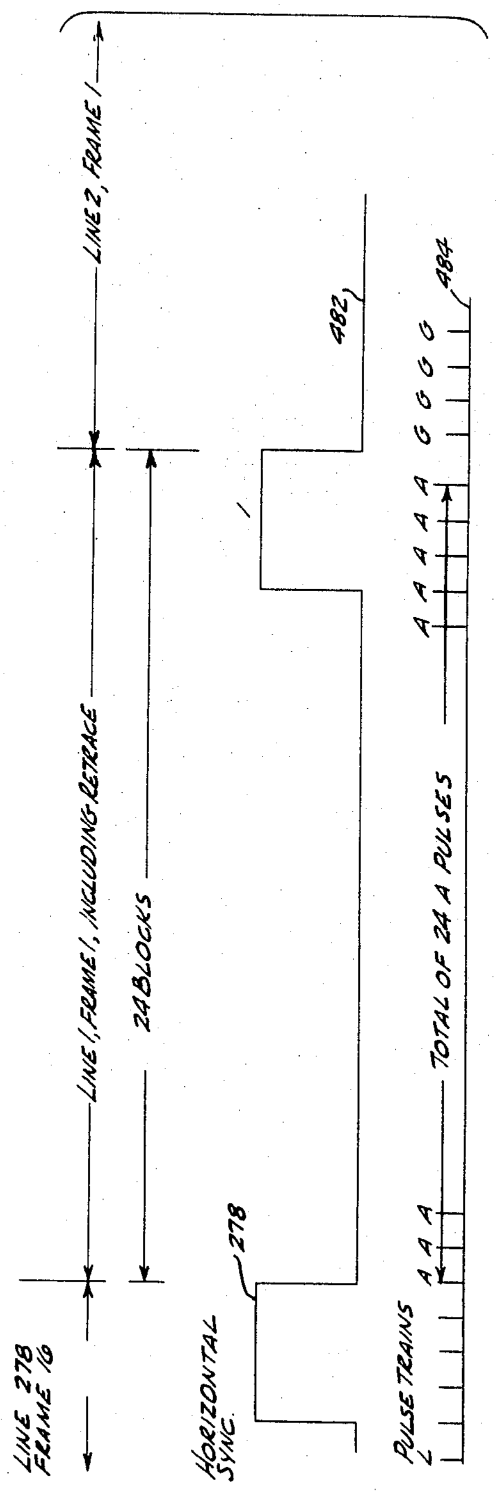
FIG. 18 is a schematic diagram of waveforms showing voltage as a function of time for explaining the line to line timing relation of the signals developed during operation of the encoder and decoder systems of FIGS. 7 and 15.

Referring now to FIG. 18 which shows the encoder timing relations on a line to line basis, the horizontal synchronizing pulses of a waveform 482 fall at times defining the period for scanning each line. During the period between the fall times of the pulses of the waveform 482, the electron beam scans through 24 blocks as explained relative to FIG. 2. Because the eight stage counter 270 shown in FIGS. 12 and 13 changes state in response to the trailing edge of the horizontal synchronizing pulse, the first pulse of the pulse train such as A rises at that time as shown by a waveform 484. For the period of scanning line 1 which may be considered in frame 1, the 24 A pulses are formed as indicated by the waveform 484. For sampling the previous line 278 of frame 16, the L pulse train provides gating, and in line 2 of frame 1, the pulse train G provides gating in accordance with the pulse train sequence of FIG. 4.

Figure 19:
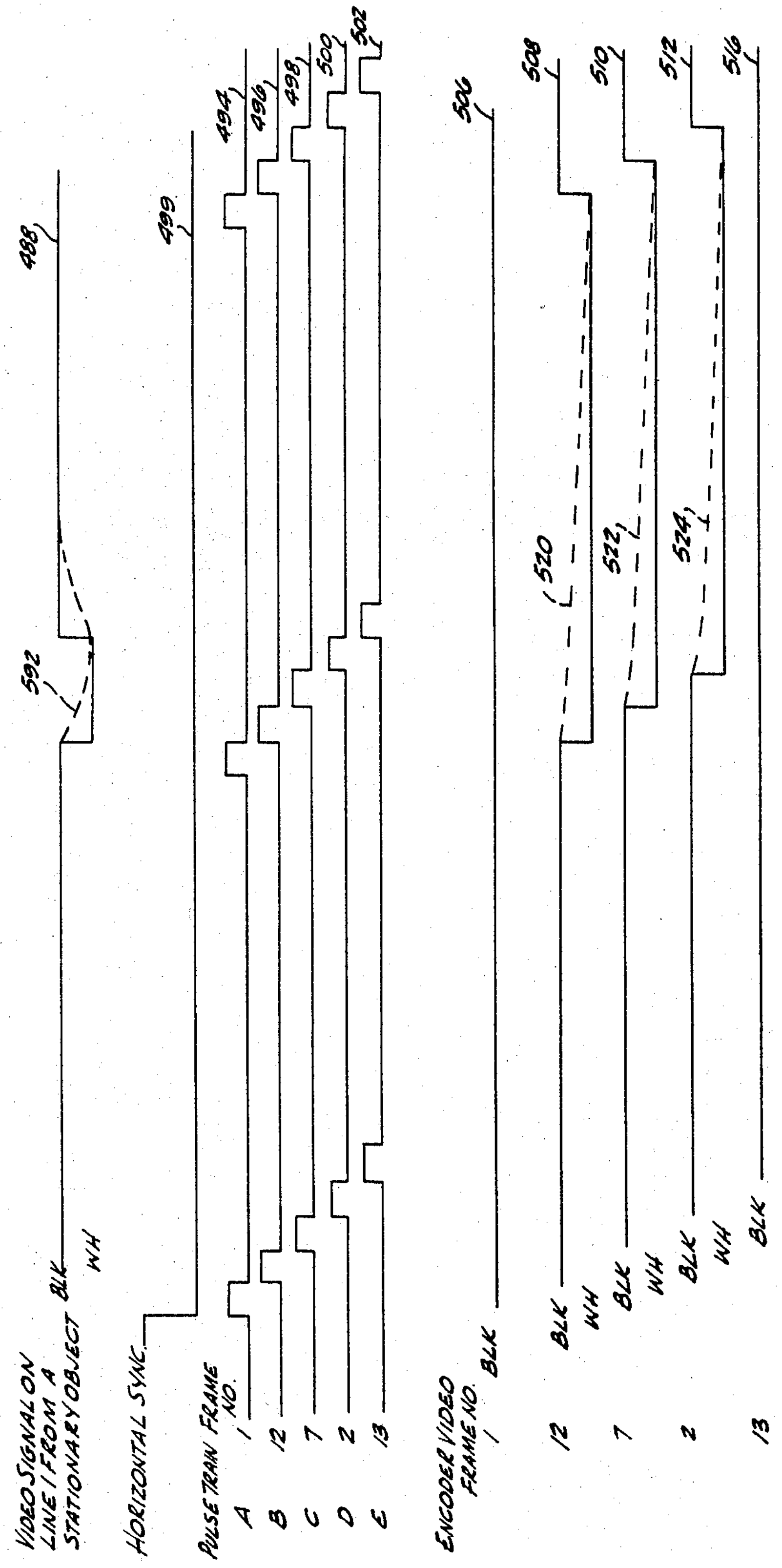
FIG. 19 is a schematic diagram of voltage waveforms as a function of time for further explaining the time-spatial sequence of sampling or gating information in the encoder system of FIG. 7.
Figure 20:
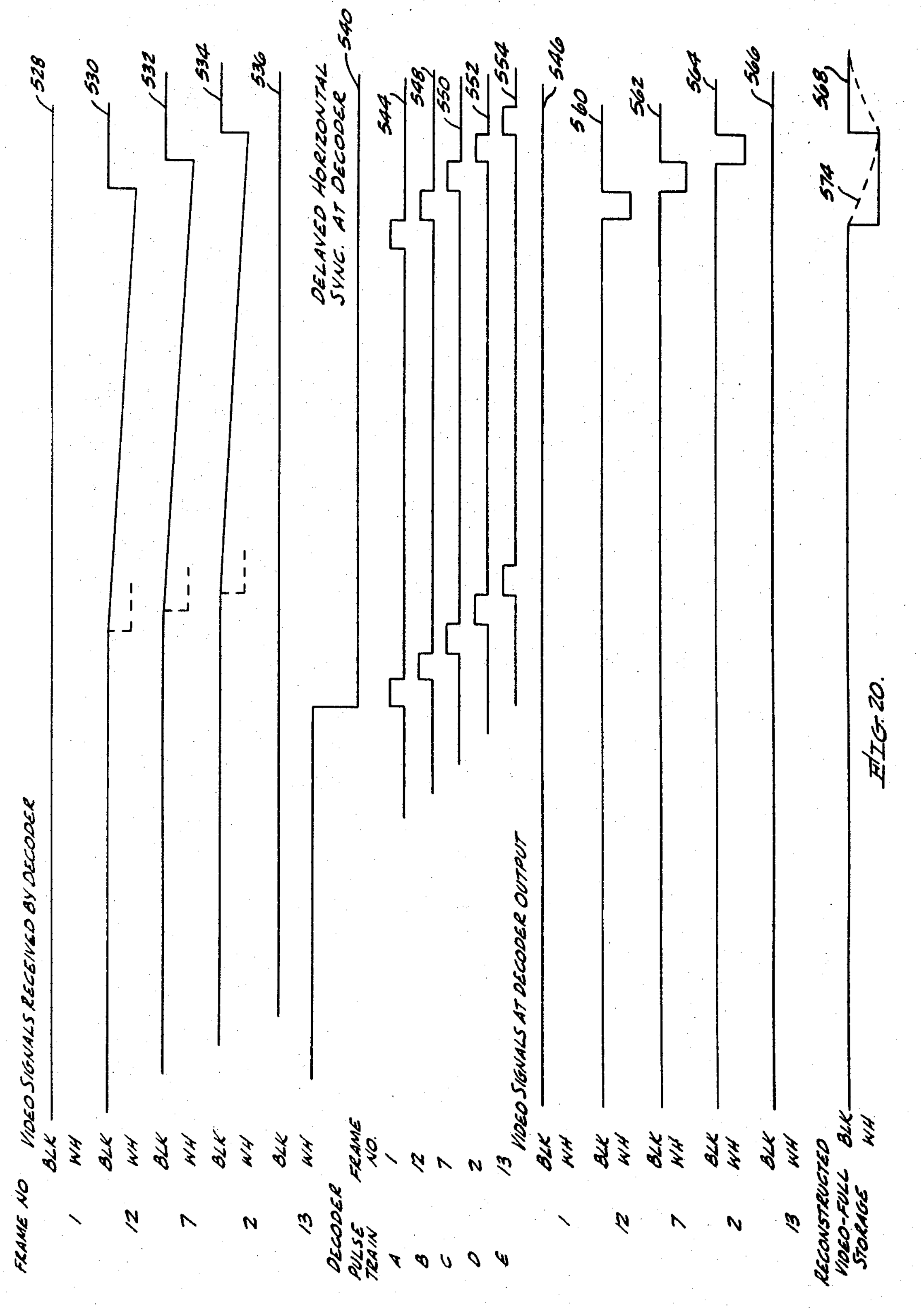
FIG. 20 is a schematic diagram of voltage waveforms as a function of time for further explaining the time-spatial sequence of sampling or gating video information in the decoder system of FIG. 15.

Referring now to the waveforms of FIGS. 19 and 20, the features of the system in accordance with the invention of reproducing the video signal at the decoder with sharp edges regardless of the effects of the filter at the encoder will be further explained. A video signal of a waveform 488 illustrates a rapid change from black to white picture information that may be repeatedly applied to the lead 124 of FIG. 7 in each of 16 low resolution frames from a stationary white object on line 1 of the camera frame or field of view. A horizontal synchronizing pulse of a waveform 490 is shown to illustrate the time of forming a pulse train A of frame number 1 indicated by a waveform 494. Because the video signal of the waveform 488 represents information scanned from a stationary object on line 1, the sampling of information along the line 1 from left to right as shown in the block 28 of FIG. 3 is in response to pulse train A for frame number 1 as shown by the waveform 494, in response to pulse train B for frame number 12 as shown by a waveform 496, in response to pulse train C for frame number 7 as shown by a waveform 498, in response to pulse train D for frame number 2 as shown by a waveform 500 and in response to pulse train E for frame number 13 as shown by a waveform 502. As explained relative to the block 28, these pulse trains represent in time the different spatial positions for the first scan line. The change from black to white levels of the video signal of the waveform 488 is positioned for illustrative purposes in block 30 of FIG. 2 so that the second pulses of each pulse train of 24 pulses provide the sampling by opening the video gate 151 of FIG. 7.

During the sampling time of the pulse train A of the waveform 494, the video signal of the waveform 488 is at a higher or black voltage level and a sampled video signal of a waveform 506 is maintained on the lead 185 at its high level representing black picture information. In response to the gating pulse of the waveform 496 in frame 12, the video signal of the waveform 488 is sampled at its low or white level and the signal on the lead 185 at this time falls to the low level of the waveform 508. It is to be noted that for purposes of illustration the gating pulses are explained in a positional sequence along line 1 rather than in a time sequence. In response to the gating pulse C of the waveform 498 the video signal on the lead 182 falls to the lower or white level in frame 7 as shown by the waveform 510 and in response to the D pulse of a waveform 500, the video signal on the lead 182 falls to the white level of a waveform 512 during the time of frame 2. When the video signal of the waveform 488 on line 1 is sampled by the second E pulse of the waveform 502 during frame 13, the video signal is at the upper or black level and the voltage on the lead 182 remains at the upper or black level as shown by a waveform 516. Although sampling only occurs during the period of the sampling pulses such as those of the waveform 496, the changed levels of the waveforms 508, 510 and 512 are retained because of the box car detector 153 storing the new level.

When the sampled signals which have changed their voltage level after sampling such as those of the waveforms 508, 510 and 512 are applied to the low pass filter 186 of FIG. 7, a video signal is applied to the lead 190 that falls to the sampled lower level with a slope determined by the rise or fall time or the time constant of the filter as shown by dotted lines 520, 522 and 524. Thus it can be seen that the low pass filter 186 which defines the narrow video bandwidth utilized in the system of the invention results in a delay of the video signal equal to a period less than that selected to form 16 consecutive gating pulses. Because each sampled video signal such as shown by the waveform 508 is applied to the low pass filter 186 for a time period equal to the width of sixteen sequential gating pulses regardless of the time of sampling of the information in each block, the low pass filter 186 has sufficient time to change storage characteristics and apply the signal to the lead 190 before the subsequent sampling time.

Referring now principally to FIG. 20 as well as to FIG. 15, the voltage levels of waveforms 528, 530, 532, 534 and 536 represent the dot information in a positional sequence of the respective waveforms 506, 508, 510, 512 and 516 after being filtered, transmitted, passed through the receiver 320 of FIG. 15, detected to video frequency and applied to the lead 322. The video signals of the waveforms 528, 530, 532, 534 and 536 respectively represent the picture brightness intensity information sampled in response to pulse train A of frame number 1, pulse train B of frame number 12, pulse train C of frame number 7, pulse train D of frame number 2 and pulse train E of frame number 13. It is to be again noted that the sampling is explained in a positional sequence along a portion of line 1 rather than in a time sequence. The delayed horizontal synchronizing pulse of a waveform 540 is developed by a delay in the delay circuit 358 of a period substantially equal to or less than one-twenty fourth of the period between horizontal synchronizing pulses (not considering delays in the filter and other circuit delays) or the period of 16 gating pulses of the pulse train sequence so that the video information is decoded by sampling after completion of the relatively slow rise or fall or change in level of the video signal caused by the low pass filter 186 of FIG. 7. For example, the delay may be equal to the pulse width of fifteen gating pulses. It is to be noted that other delay periods may be utilized in accordance with the principles of the invention. Thus, the delayed horizontal synchronizing pulses of the waveform 540 falls at a time which may be one gating pulse width before the fall of the horizontal synchronizing pulse at the encoder when not considering transmission and other delays. The first pulses of the pulse trains A, B, C, D and E are formed having a time relation relative to the canning of line 1 such that the pulse train A starts at the fall of the delay horizontal synchronizing pulse of the waveform 540. The first pulse of the 24 pulses of an A pulse train of a waveform 544 samples the video signal of the waveform 528 but because the level is substantially unchanged, the signal of the waveform 546 on the lead 374 retains substantially a constant black level. In a similar manner, in response to the first gating pulses of pulse trains B, C, D and E of respective waveforms 548, 550, 552 and 544 when line 1 is being scanned, substantially no change in level of the gated information of respective waveforms 560, 562, 564 and 566 is developed.

At times as explained relative to FIGS. 3 and 4 when line 1 is scanned, the eight stage counter 270 of FIG. 12 provides pulses which develop the second pulses of the pulse trains A, B, C, D and E that are applied to the video gate 324. In response to the A pulse of the waveform 544 the video signal of the waveform 528 is again sampled and the level of the video signal of the waveform 546 remains unchanged. In response to the B pulse of the waveform 548 in frame 12, the waveform 530 is sampled to apply a video signal to the lead 374 changing from a black to a white level of the waveform 560 during the B pulse. In frame 7, pulse train C samples the video signal of the waveform 532 to apply a video signal of the waveform 562 to the lead 374 and in frame number 2 the pulse train D as shown by the waveform 552 samples the white signal of the waveform 534 to apply the video signal of the waveform 564 to the lead 374. At a time of pulse train E of frame number 13, the video signal of the waveform 536 is sampled and the voltage on the lead 374 remains at substantially the same level as shown by the waveform 566. The video dot information signals of the waveforms 546, 560, 562, 564 and 566 have a time sequence in the different frames as explained relative to FIG. 4.

The reconstructed video signal developed on the face of the cathode ray tube such as 408 with the dot information stored between the times of frames 1 and 13 is shown by a waveform 568 which effectively represents the combined signal levels of the waveforms 546, 560, 562, 564 and 566. The video signal of the waveform 568 represents the intensity levels of the first 5 dots such as 29 and 31 (FIG. 3) along line 1 of the second block 30 (FIG. 2) as developed on the screen of the cathode ray tube 408, for example. The effective reconstructed video of the waveform 568 formed by the sampling technique in accordance with the invention thus has substantially the same configuration as the video signal of the waveform 488 as shown in FIG. 19.

If a system were utilized in which the video bandwidth were reduced by conventional techniques with the resultant decrease of the information per frame, the video signal of the waveform 488 after being applied to a filter, would have a configuration shown by a dotted curve 592 of FIG. 19, the delay in response of the filter being omitted for convenience of illustration. Similarly, when the conventional video signal of the dotted curve 592 is applied to a display tube, the effective video signal would have a configuration shown by a dotted curve 574 shown at the waveform 568 of FIG. 20. Thus, the sampling system in accordance with this invention allows an improved video signal to be developed substantially duplicating sharp rises and falls of the camera video signal at the receiver while utilizing a band-pass or low pass filter as is conventionally required for bandwidth limitation. It is to be again noted that the sample period of the video signal as shown by the waveforms 560, 562 and 564 results in the final picture such as on the screen of the cathode ray tube 408 being formed of variable brightness intensity dots having initial levels referenced to the upper of black level of the video waveforms such as 560 and 562. As shown in FIGS. 2 and 3, the combined dots for 16 low resolution frames are located on the display screen with a uniform pattern across the surface thereof.

Referring now to FIG. 21, the characteristics of the cathode ray tube 400 having a short persistence phosphor on the screen thereof is shown by a curve 478. During one high resolution frame period, that is, 16 low resolution frames or the period between 16 vertical synchronizing pulses, the short persistence phosphor may completely lose a stored intensity level. For rapidly moving objects in the television picture, a short persistence phosphor of the curve 478 is desirable to prevent blurring caused by the relatively slow change of information as the object being viewed changes position. Because of the substantial lack of storage of the low persistence phosphor tube 400, the resolution of the picture is relatively low as the dot pattern of a single frame having a low dot density may be substantially the only information displayed on the screen at any one time. However, as discussed previously, the human observer tolerates a low resolution for rapidly moving objects. A curve 480 shows the storage level characteristics for a medium persistence phosphor of the display tube 404. For objects moving at a relatively slow rate the tube 404 thus provides some storage to increase the resolution but changes its previous storage level in a sufficiently short time that moving objects are not blurred to the observer. Thus the picture on the screen of the cathode ray tube 404 may at any one time display dot information from 8 low resolution frames, for example, to increase the resolution to 8 times that of a single frame but with some small blurring resulting from the storage time which is substantially 8 times the blurring that occurs when utilizing the tube with a short persistence phosphor. The cathode ray tube 408 may have a long persistence phosphor on the screen thereof having characteristics shown by a curve 482 so that over a high resolution frame period or 16 low resolution frame periods the storage level of brightness intensity may only decrease to substantially one-half of the initial level. Thus, for stationary objects the long persistence phosphor characteristic of the curve 482 is highly desirable to provide a high resolution picture with the information from 16 frames being displayed at any one time. However, because the storage of an energy level for the tube 408 persists relatively unchanged not only during any high resolution frame period but into the next high resolution frame period, a moving object appears to be blurred to the observer when applying video signals to the cathode ray tube 408. However, for certain rates of movement, the human observer tolerates a certain amount of blurring. Thus, the switch 382 is energized to connect the video signal to the leads 386, 388 or 390 depending upon when objects being viewed are moving relatively fast, have a medium rate of movement, or have slow motion or are substantially stationary. The switch 382, for example, may be manually changed in position by observing the screens of the tubes 400, 404 and 408.

To provide a single dot pattern picture having a high resolution for stationary objects and a low resolution for moving objects substantially without a blurring effect, the switch 440 may be controlled in synchronism with the switch 382 so that the picture on the selected tube 400, 404 or 408 is continuously presented on the screen of the tube 446. Thus, the system in accordance with the invention provides an arrangement to vary the storage of the dot information which is effectively a change of the frame rate at the encoder. A short storage time is effectively a high frame rate or the frame rate of transmission as the information in each low resolution frame may only persist for a time substantially equal to that low resolution frame period. A long storage time is effectively a low frame rate at the decoder because the information of all 16 low resolution frames is stored (effectively repeated) on the display screens for 16 times, for example.

Referring now to FIG. 22, the storage characteristic in accordance with the principles of the invention will be further explained. The graph shows the reciprocal of object size in picture elements, which is a proportional function of the resolution of the picture, versus object motion in picture elements per second representing the number of dots in the final picture that an object passes through when moving across the screen in one second. For applying information to the television screen at 30 frames per second, a curve 584 shows the variation of resolution with rate of motion representing the short storage condition, at 7.5 frames per second a curve 586 represents the medium storage condition and at 1.87 frames per second a curve 590 represents the long storage condition. The curves 584, 586 and 590 start to slope from the horizontal with increasing object motion at a point where the object motion in picture elements per frame is equal to one-half of the object size in picture elements. At 1.87 frames per second, the resolution starts to decrease at 0.85 picture elements per second, at 30 frames per second the relatively low resolution starts to decrease at a motion rate of approximately 204 picture elements per second and at 7.5 frames per second the resolution starts to decrease at a motion rate of approximately 14 picture elements or dots per second. For motion rates greater than when the 30 frames per second curve 584 crosses the 7.5 frames per second curve 586 (50 picture elements per second object motion) the no storage condition of the tube 400 provides the most desirable television picture. For motion rates below the point at which the curves 584 and 586 cross, the medium storage tube 404 provides the most desirable picture. For motion rates below approximately 3.5 picture elements per second where the curves 586 and 590 cross, the long storage tube 408 provides the most desirable picture. A line 591 shows a maximum limit of the resolution for any frame rate utilizing the dot interlace system of the invention. Therefore, selection of different storage characteristics for the display tube effectively changes the display frame rate so that the assembled picture has maximum resolution characteristics without substantial blurring during motion or during rapid motion.

It is to be noted that the system in accordance with the principles of this invention is not to be limited to the particular storage arrangement shown in FIG. 15 but may include other types of devices that have selectively variable storage characteristics such as tonotron tubes, for example. Also, the system in accordance with this invention is not to be limited to any particular dot pattern such as that shown in FIG. 3 but other dot patterns having a desired uniformity for each frame or for each combination of frames may be utilized. The particular dot pattern shown in FIG. 3 is found to be sufficiently uniform for each frame and for each combination of sequential frames to substantially eliminate dot crawling effects and dot patterning effects.

In a conventional television picture the vertical resolution is described as the number of active scan lines in the picture multiplied by the Kell factor which is typically 0.71. As is well known in the art, the Kell factor relates the statistical effectiveness of a noncontinuous or discrete line raster relative to the fine picture detail. The horizontal resolution in a conventional variable luminance line picture is equal to the number of alternating black and white elements per line that can be transmitted. In the system in accordance with the invention both the horizontal and the vertical resolution is described as a function of the number of dots in that direction, the dots being spatially positioned in symmetrical horizontal and vertical rows for the long storage condition. Because the television pictures conventionally have an aspect ratio of 4 to 3, the number of dots in the horizontal and vertical directions may have that relation to provide similar horizontal and vertical resolution characteristics. For the respective horizontal and vertical blanking, approximately 16.6 percent and 7 percent of the time may be allotted to the blanking, which blanking times are considered in determining the resolution. The resolution when utilizing a long period storage in the vertical direction is equal to the Kell factor times the number of effective lines of dots or approximately 184 lines. The number of picture elements or dots in the horizontal direction is selected as 384, for example, because of the desire to maintain substantially equal horizontal and vertical resolution. When the number of dots in the horizontal direction considering the blanking time are multiplied by the Kell factor, the horizontal resolution may be 171 lines which is substantially similar to the vertical resolution. It is to be noted that this resolution as determined by the Kell factor is for stationary objects with a long storage time as determined by the long persistence phosphor.

One set of parameters that may be utilized in a system in accordance with the principles of this invention is listed below. It is to be understood that these parameters only represent one arrangement of the television system and many other arrangements may be utilized in accordance with the invention.

Low resolution frame rate=30 frames per second,
Vertical blanking=0.07V, where V represents the total repetition period of the vertical synchronizing pulses,
Horizontal blanking=0.166H, where H represents the total repetition period of the horizontal synchronizing pulses,
Vertical interlace ratio=1:1,
Multiple interlace ratio=16:1,
High resolution frame rate=1.87 frames per second,
H or horizontal synchronizing pulse rate=8340 pulses per second,
V or vertical synchronizing rate=30 frames per second
Kell factor=0.71,
Horizontal resolution=171 lines,
Vertical resolution=184 lines,
Required transmission bandwidth=100 kilocycles,
Camera and the decoded information bandwidth=1.6 megacycles.

Thus, a television system has been described that operates with a substantially narrow video bandwidth to allow transmitting of information with a minimum of power. In response to the luminance or luminous intensity of a picture or scene of view as represented by the charge pattern on the screen of a vidicon the system responds to develop a luminance signal which is encoded and decoded to provide a television picture of dots having a brightness representing a luminance that is proportional to the luminance of the scene of view. The system provides dot sampling of the luminance of a scene being viewed to develop video information signals and decoding of the sampled video signals with a delay selected to overcome any detrimental effects of time delay provided in the low pass filter at the transmitter. The sampled video signals are stretched in time prior to transmission so that the filter passes the video signals without losses in amplitude or positional information. A complete high resolution frame is formed of a plurality of low resolution frames which for moving objects in the scene being viewed may be presented to the viewer with a substantially small storage so as to substantially eliminate blurring effects. In order to provide a high resolution picture for stationary objects the system provides an arrangement to increase the storage of the dot information of variable brightness intensity of the low resolution frames so that the low resolution information is effectively repeated in the final picture. This storage feature in accordance with the invention is an effective lowering of the frame rate at the decoder so that maximum resolution is obtained from the sequence of low resolution frames making up the assimilated picture. Also, because of the sequential sampling arrangement in accordance with the invention, rapid changes of the video signal are reliably reproduced with similar rise and fall times substantially without being affected by filters required at the transmitter. The substantially uniform sampling of pattern allows dot sampling without undesirable dot crawling or patterning effects in the television picture. The system has an advantage of developing a complete video signal at the camera so the picture may be monitored thereat. Thus, the system in accordance with the invention provides a narrow band television system to provide highly desirable pictures both for stationary and moving objects.

What is claimed is:

1. A television system responsive to a plurality of elements of a scene comprising means for sampling the light characteristics of a portion of the elements in each of a plurality of substantially uniform patterns to develop a plurality of frames of sampled video signals, said plurality of patterns in combination forming the plurality of elements of said scene, means responsive to said plurality of frames of sampled signals to form a continuous video signal, filter means responsive to said continuous video signal to form a first narrow-band video signal, means responsive to said first narrow-band video signal to convey the light characteristic information to a remote position and develop a second narrow-band video signal, means including delay means for sampling the second narrow-band video signal as dot patterns in a delayed time sequence representative of said plurality of frames, and means for displaying, with each frame having a selected storage time, the sampled second video signal to represent the elements of said scene.

2. A television system responsive to picture information on a screen comprising a plurality of first means for scanning the screen in repetitive scan rasters and developing a video signal having amplitude characteristics representative of said picture information, first sampling means coupled to said first means for gating pulses of said video signal therethrough at times representative of a substantially uniform pattern over the area of said screen during each scan raster, the video signal developed from a predetermined plurality of said scan rasters forming a total pattern substantially over the entire area, box car means coupled to said sampling means for forming a continuous video signal having amplitude characteristics representative of the sampled picture information, means coupling said box car means to a point to apply a video signal thereto having amplitude characteristics representative of said picture information, second sampling means coupled to said box car means for receiving a video signal and passing pulses of said video signal therethrough at times representative of said uniform patterns of said plurality of scan rasters to form video pulses, and means coupled to said second sampling means for displaying with a selected storage time said video pulses as a plurality of dots in said uniform patterns of said plurality of scan rasters.

3. A television system comprising camera means for scanning a plurality of picture elements representative of a scene and developing in response to a timing signal, a video signal representative of the luminance of the picture elements, a first video gate coupled to said camera means, a gating pulse train generator coupled to said first video gate for developing a plurality of gating pulse trains, a gating pulse train selector coupled to said camera means and to said gating pulse train generator for sequentially applying said plurality of gating pulse trains to said video gate to sample said video signal in a predetermined time pattern representative of a predetermined spatial pattern of said picture elements, box car means coupled to said video gate for forming a continuous video signal, filter means coupled to said box car means, transmission means coupled to said filter means and to said camera means for transmitting a signal representative of the filtered video signal and said timing signal, receiving means responsive to the transmitted signal to develop a filtered video signal and a timing signal, a second video gate coupled to said receiving means, a second gating pulse train generator coupled to said receiving means and to said second video gate, a second gating pulse selector coupled to said receiving means and to said second gating pulse train generator for responding to said timing signal to sample said video signal in a predetermined time pattern, and display means having selectable storage characteristics for providing a picture of dots of variable brightness from the video signal sampled by said second video gate.

4. A television system responsive to a video signal having amplitude characteristics representative of the luminance of a plurality of elements of a scene applied to an area, the area being horizontally scanned over a vertical dimension comprising timing means for developing timing signals to control the scanning of said area, a first video gate, a first source of gating pulses coupled to said timing means and to said first video gate for gating said video signal in a time sequence to sample the luminance of the scene in a plurality of positional patterns which in combination provide the plurality of elements of said area, means responsive to the sampled video signal to form a continuous video signal, filter means coupled to said means responsive to the sampled video signal for developing a filtered video signal changing amplitude characteristics with a predetermined delay, conveying means coupling filter means and said timing means for developing timing signals and for developing a video signal having amplitude characteristics representative of said filtered video signal, second timing means coupled to said conveying means for developing horizontal and vertical timing signals, delay means coupled to said second timing means for delaying said horizontal and vertical timing signals a period substantially equal to said predetermined delay to form delayed horizontal and vertical timing signals, means coupled to said delay means for sampling said video signal developed by said conveying means in a time sequence similar to that of said first video gate to form a plurality of video pulses having amplitude characteristics representative of the luminance of the elements of said plurality of positional patterns, and display means having variable storage characteristics coupled to said means for sampling to form a pattern of dots of brightness intensity representative of the luminance of corresponding elements of said scene.

5. A system for conveying luminance information of a plurality of elements of a scene comprising first timing means for forming a timing signal, camera means coupled to said first timing means for scanning a surface having information thereon representative of the elements of the scene and developing a video signal, a first video gate coupled to said camera means, a first gating pulse train generator coupled to said timing means and to said first video gate for repetitively developing a plurality of pulse trains for sampling the video signal developed by said camera means, a first sequence selector coupled to said first timing means and to said first gating pulse train generator for controlling said generator to sample said video signal at times representative of a predetermined pattern of the elements over the scene at said camera means, box car means coupled to said video gate to form a continuous video signal, filter means coupled to said box car means, signal conveying means coupled to said filter means and to said timing means for conveying signals and said timing signal, a second video gate coupled to said signal conveying means for receiving a video signal representative of said filtered video signal, second timing means coupled to said signal conveying means for responding to said signal representative of said timing signal, a second gating pulse train generator coupled to said second timing means and to said second video gate for developing a plurality of pulse trains, a second sequence selector coupled to said second timing means and to said second gating pulse train generator for controlling said generator to sample said video signal at times representative of said predetermined pattern of the elements over said scene at said camera means, and means coupled to said second video gate for storing the sampled video information for a selected period to provide a picture of dots in positions corresponding to the elements of said scene and having a luminance proportional to the corresponding elements of said scene.

6. A television system responsive to a scene of view comprising first timing means for developing clock pulses and horizontal and vertical sweep signals, vidicon means coupled to said timing means for responding to said horizontal and vertical sweep signals to repetitively scan along a plurality of scan line positions over a screen having information thereon representative of a plurality of elements forming said scene of view, said vidicon means developing a video signal having amplitude characteristics representative of the luminance of said elements during the scanning along said plurality of scan lines, a first video gate coupled to said vidicon means, a first gating pulse train generator including gating means coupled to said first timing means and to said first video gate for repetitively developing a plurality of pulse trains in a predetermined pulse train sequence, a predetermined plurality of pulse train sequences occurring during each scan over said screen, a first gating pulse train sequence selector coupled to said first timing means and to the gating means of said first gating pulse train generator for applying said plurality of pulse trains to said first video gate from a selected starting pulse train in each sequence of said predetermined plurality of pulse train sequences to control said first video gate to pass a sampled low resolution video signal therethrough, box car means coupled to said second video gate for forming a continuous video signal from the sampled video signals, low pass filter means coupled to said box car means to form a filtered video signal from said continuous video signal having amplitude characteristics delayed a predetermined period, transmitting means coupled to said first timing means and to said low pass filter means for transmitting a signal representative of said clock pulses and the filtered video signal, receiving means coupled to said transmitting means for developing a video signal having amplitude characteristics similar to the filtered video signal and for developing clock pulses, second timing means coupled to said receiving means for responding to said clock pulses to develop horizontal and vertical synchronizing pulses, delay means coupled to said second timing means for developing delayed timing signals having delays substantially equal to said predetermined period, a second gating pulse train generator coupled to said delay means and including a gating means coupled to said second video gate, said second gating pulse train generator repetitively developing a plurality of pulse trains in said predetermined pulse train sequence, a second gating pulse train sequence selector coupled to said delay means and to the gating means of said second gating pulse train generator for applying said plurality of pulse trains to said first video gate from a selected starting pulse train in each sequence of said plurality of pulse train sequences to control said second video gate to pass a sampled video signal therethrough, storage selection means coupled to said second video gate, and a plurality of display means coupled to said storage selection means each having selected storage characteristics for storing and displaying dots from said sampled video signal for a predetermined period having brightness characteristics representative of the luminance of corresponding elements of the scene of view.

7. A television system responsive to a scene of view to develop a picture thereof comprising first timing means for developing a first timing signal, vidicon means coupled to said first timing means for scanning an area storing information representative of a plurality of elements of said field of view and developing a video signal having amplitude characteristics representative of the variable luminance of said scene of view, a first video gate coupled to said vidicon means, first gating pulse forming means coupled to said first video gate for passing said video signal as pulses through said first video gate in a time sequence representative of a plurality of sequential spatial patterns of element positions of the scene of view, box car means coupled to said first video gate for responding to the pulses passed therethrough to develop a continuous video signal, a low pass filter coupled to said box car means for forming a first narrow-band video signal, transmission means coupled to said first timing means and to said low pass filter for transmitting a signal having informational characteristics representative of said timing signal and a signal having informational characteristics representative of the amplitude of said first narrow-band video signal, receiving means coupled to said transmitting means for developing a second timing signal and a second narrow-band video signal having amplitude characteristics representative of the amplitude characteristics of said first narrow-band video signal, second timing means coupled to said receiving means for responding to said second timing signal, a second video gate coupled to said receiving means, second gating pulse forming means coupled to said second timing means and to said second video gate for passing said second narrow-band video signal therethrough as pulses in a time sequence representative of said plurality of sequential spatial patterns of etement positions of said scene of view, a plurality of display means each having different storage characteristics of picture elements thereon, and switching means coupled between said second video gate and said plurality of display means for selectively varying the storage characteristics of the picture elements, said plurality of display means responding to the pulses passed through said second video gate to form a plurality of dots of brightness intensity representative of the luminance of corresponding elements of said scene of view.

References Cited

UNITED STATES PATENTS

| | | | |
|---|---|---|---|
| 1,602,121 | 10/1926 | Ramsey | 178—7.6 |
| 2,906,816 | 9/1959 | Kretzmer | 178—6 |
| 2,955,159 | 10/1960 | Jones | 178—6 |
| 3,037,083 | 5/1962 | Inouye | 178—6 |
| 3,192,315 | 6/1965 | Remely | 178—6 |
| 2,823,258 | 2/1958 | Schlesinger. | |
| 2,824,904 | 2/1958 | Toulon. | |
| 2,940,005 | 6/1960 | Toulon. | |
| 2,996,574 | 8/1961 | Tobey. | |
| 3,309,461 | 3/1967 | Deutsch. | |

ROBERT L. GRIFFIN, *Primary Examiner.*

J. A. ORSINO, *Assistant Examiner.*

U.S. Cl. X.R.

178—6; 179—15.55